US012250526B2

(12) United States Patent
Tian et al.

(10) Patent No.: US 12,250,526 B2
(45) Date of Patent: Mar. 11, 2025

(54) AUDIO BEAMFORMING WITH NULLING CONTROL SYSTEM AND METHODS

(71) Applicant: Shure Acquisition Holdings, Inc., Niles, IL (US)

(72) Inventors: Wenshun Tian, Palatine, IL (US); Michael Ryan Lester, Colorado Springs, CO (US)

(73) Assignee: Shure Acquisition Holdings, Inc., Niles, IL (US)

( * ) Notice: Subject to any disclaimer, the term of this patent is extended or adjusted under 35 U.S.C. 154(b) by 253 days.

(21) Appl. No.: 18/151,042

(22) Filed: Jan. 6, 2023

(65) Prior Publication Data

US 2023/0224635 A1 Jul. 13, 2023

Related U.S. Application Data

(60) Provisional application No. 63/266,555, filed on Jan. 7, 2022.

(51) Int. Cl.
*H04R 1/28* (2006.01)
*G10L 21/0232* (2013.01)
(Continued)

(52) U.S. Cl.
CPC .......... *H04R 3/005* (2013.01); *G10L 21/0232* (2013.01); *H04R 1/406* (2013.01); *G10L 2021/02082* (2013.01); *G10L 2021/02166* (2013.01); *H04R 2201/401* (2013.01); *H04R 2410/01* (2013.01)

(58) Field of Classification Search
CPC .. H04R 3/005; H04R 1/406; H04R 2201/401; H04R 2410/01; G10L 21/0232; G10L 2021/02082; G10L 2021/02166
See application file for complete search history.

(56) References Cited

U.S. PATENT DOCUMENTS 1,535,408 A 4/1925 Fricke
1,540,788 A 6/1925 McClure
(Continued)

FOREIGN PATENT DOCUMENTS

AU 2004200802 3/2004
CA 2359771 4/2003
(Continued)

OTHER PUBLICATIONS

Johansson et al., Robust Acoustic Direction of Arrival Estimation using Root-SRP-PHAT, a Realtime Implementation, EEE International Conference on Acoustics, Speech, and Signal Processing, Mar. 2005, 4 pgs.

(Continued)

*Primary Examiner* — Mark Fischer
(74) *Attorney, Agent, or Firm* — Neal, Gerber & Eisenberg LLP

(57) ABSTRACT

Audio beamforming systems and methods that enable more precise control of lobes and nulls of an array microphone are provided. Optimized beamformer coefficients can be generated to result in beamformed signals associated with one or more lobes steered towards one or more desired sound locations and one or more nulls steered towards one or more undesired sound location. The performance of acoustic echo cancellation can be improved and enhanced.

20 Claims, 5 Drawing Sheets

(51) Int. Cl.

| | |
|---|---|
| ***H04R 1/02*** | (2006.01) |
| ***H04R 1/40*** | (2006.01) |
| ***H04R 3/00*** | (2006.01) |
| *G10L 21/0208* | (2013.01) |
| *G10L 21/0216* | (2013.01) |

(56) References Cited

U.S. PATENT DOCUMENTS 1,965,830 A 7/1934 Hammer
2,075,588 A 3/1937 Meyers
2,113,219 A 4/1938 Olson
2,164,655 A 7/1939 Kleerup
D122,771 S 10/1940 Doner
2,233,412 A 3/1941 Hill
2,268,529 A 12/1941 Stiles
2,343,037 A 2/1944 Adelman
2,377,449 A 6/1945 Prevette
2,481,250 A 9/1949 Schneider
2,521,603 A 9/1950 Prew
2,533,565 A 12/1950 Eichelman
2,539,671 A 1/1951 Olson
2,777,232 A 1/1957 Kulicke
2,828,508 A 4/1958 Labarre
2,840,181 A 6/1958 Wildman
2,882,633 A 4/1959 Howell
2,912,605 A 11/1959 Tibbetts
2,938,113 A 5/1960 Schnell
2,950,556 A 8/1960 Larios
3,019,854 A 2/1962 Obryant
3,132,713 A 5/1964 Seeler
3,143,182 A 8/1964 Sears
3,160,225 A 12/1964 Sechrist
3,161,975 A 12/1964 McMillan
3,205,601 A 9/1965 Gawne
3,239,973 A 3/1966 Hannes
3,240,883 A 3/1966 Seeler
3,310,901 A 3/1967 Sarkisian
3,321,170 A 5/1967 Vye
3,509,290 A 4/1970 Mochida
3,573,399 A 4/1971 Schroeder
3,657,490 A 4/1972 Scheiber
3,696,885 A 10/1972 Grieg
3,755,625 A 8/1973 Maston
3,828,508 A 8/1974 Moeller
3,857,191 A 12/1974 Sadorus
3,895,194 A 7/1975 Fraim
3,906,431 A 9/1975 Clearwaters
D237,103 S 10/1975 Fisher
3,936,606 A 2/1976 Wanke
3,938,617 A 2/1976 Forbes
3,941,638 A 3/1976 Horky
3,992,584 A 11/1976 Dugan
4,007,461 A 2/1977 Luedtke
4,008,408 A 2/1977 Kodama
4,029,170 A 6/1977 Phillips
4,032,725 A 6/1977 McGee
4,070,547 A 1/1978 Dellar
4,072,821 A 2/1978 Bauer
4,096,353 A 6/1978 Bauer
4,127,156 A 11/1978 Brandt
4,131,760 A 12/1978 Christensen
4,169,219 A 9/1979 Beard
4,184,048 A 1/1980 Alcaide
4,198,705 A 4/1980 Massa
D255,234 S 6/1980 Wellward
D256,015 S 7/1980 Doherty
4,212,133 A 7/1980 Lufkin
4,237,339 A 12/1980 Bunting
4,244,096 A 1/1981 Kashichi
4,244,906 A 1/1981 Heinemann
4,254,417 A 3/1981 Speiser
4,275,694 A 6/1981 Nagaishi
4,296,280 A 10/1981 Richie
4,305,141 A 12/1981 Massa
4,308,425 A 12/1981 Momose
4,311,874 A 1/1982 Wallace, Jr.
4,330,691 A 5/1982 Gordon
4,334,740 A 6/1982 Wray
4,365,449 A 12/1982 Liautaud
4,373,191 A 2/1983 Fette
4,393,631 A 7/1983 Krent
4,414,433 A 11/1983 Horie
4,429,850 A 2/1984 Weber
4,436,966 A 3/1984 Botros
4,449,238 A 5/1984 Lee
4,466,117 A 8/1984 Rudolf
4,485,484 A 11/1984 Flanagan
4,489,442 A 12/1984 Anderson
4,518,826 A 5/1985 Caudill
4,521,908 A 6/1985 Miyaji
4,566,557 A 1/1986 Lemaitre
4,593,404 A 6/1986 Bolin
4,594,478 A 6/1986 Gumb
D285,067 S 8/1986 Delbuck
4,625,827 A 12/1986 Bartlett
4,653,102 A 3/1987 Hansen
4,658,425 A 4/1987 Julstrom
4,669,108 A 5/1987 Deinzer
4,675,906 A 6/1987 Sessler
4,693,174 A 9/1987 Anderson
4,696,043 A 9/1987 Iwahara
4,712,231 A 12/1987 Julstrom
4,741,038 A 4/1988 Elko
4,752,961 A 6/1988 Kahn
4,768,086 A 8/1988 Paist
4,805,730 A 2/1989 O'Neill
4,815,132 A 3/1989 Minami
4,860,366 A 8/1989 Fukushi
4,862,507 A 8/1989 Woodard
4,866,868 A 9/1989 Kass
4,881,135 A 11/1989 Heilweil
4,888,807 A 12/1989 Reichel
4,903,247 A 2/1990 Van Gerwen
4,923,032 A 5/1990 Nuernberger
4,928,312 A 5/1990 Hill
4,969,197 A 11/1990 Takaya
5,000,286 A 3/1991 Crawford
5,038,935 A 8/1991 Wenkman
5,058,170 A 10/1991 Kanamori
5,088,574 A 2/1992 Kertesz, III
D324,780 S 3/1992 Sebesta
5,121,426 A 6/1992 Baumhauer
D329,239 S 9/1992 Hahn
5,189,701 A 2/1993 Jain
5,204,907 A 4/1993 Staple
5,214,709 A 5/1993 Ribic
5,224,170 A 6/1993 Waite, Jr.
D340,718 S 10/1993 Leger
5,289,544 A 2/1994 Franklin
D345,346 S 3/1994 Alfonso
D345,379 S 3/1994 Chan
5,297,210 A 3/1994 Julstrom
5,322,979 A 6/1994 Cassity
5,323,459 A 6/1994 Hirano
5,329,593 A 7/1994 Lazzeroni
5,335,011 A 8/1994 Addeo
5,353,279 A 10/1994 Koyama
5,359,374 A 10/1994 Schwartz
5,371,789 A 12/1994 Hirano
5,383,293 A 1/1995 Royal
5,384,843 A 1/1995 Masuda
5,396,554 A 3/1995 Hirano
5,400,413 A 3/1995 Kindel
D363,045 S 10/1995 Phillips
5,473,701 A 12/1995 Cezanne
5,509,634 A 4/1996 Gebka
5,513,265 A 4/1996 Hirano
5,525,765 A 6/1996 Freiheit
5,550,924 A 8/1996 Helf
5,550,925 A 8/1996 Hori
5,555,447 A 9/1996 Kotzin
5,574,793 A 11/1996 Hirschhorn
5,602,962 A 2/1997 Kellermann
5,633,936 A 5/1997 Oh

(56) References Cited

U.S. PATENT DOCUMENTS

| | | | |
|---|---|---|---|
| 5,645,257 | A | 7/1997 | Ward |
| D382,118 | S | 8/1997 | Ferrero |
| 5,657,393 | A | 8/1997 | Crow |
| 5,661,813 | A | 8/1997 | Shimauchi |
| 5,673,327 | A | 9/1997 | Julstrom |
| 5,687,229 | A | 11/1997 | Sih |
| 5,706,344 | A | 1/1998 | Finn |
| 5,715,319 | A | 2/1998 | Chu |
| 5,717,171 | A | 2/1998 | Miller |
| D392,977 | S | 3/1998 | Kim |
| D394,061 | S | 5/1998 | Fink |
| 5,761,318 | A | 6/1998 | Shimauchi |
| 5,766,702 | A | 6/1998 | Lin |
| 5,787,183 | A | 7/1998 | Chu |
| 5,796,819 | A | 8/1998 | Romesburg |
| 5,848,146 | A | 12/1998 | Slattery |
| 5,870,482 | A | 2/1999 | Loeppert |
| 5,878,147 | A | 3/1999 | Killion |
| 5,888,412 | A | 3/1999 | Sooriakumar |
| 5,888,439 | A | 3/1999 | Miller |
| D416,315 | S | 11/1999 | Nanjo |
| 5,978,211 | A | 11/1999 | Hong |
| 5,991,277 | A | 11/1999 | Maeng |
| 6,035,962 | A | 3/2000 | Lin |
| 6,039,457 | A | 3/2000 | O'Neal |
| 6,041,127 | A | 3/2000 | Elko |
| 6,049,607 | A | 4/2000 | Marash |
| D424,538 | S | 5/2000 | Hayashi |
| 6,069,961 | A | 5/2000 | Nakazawa |
| 6,125,179 | A | 9/2000 | Wu |
| D432,518 | S | 10/2000 | Muto |
| 6,128,395 | A | 10/2000 | De Vries |
| 6,137,887 | A | 10/2000 | Anderson |
| 6,144,746 | A | 11/2000 | Azima |
| 6,151,399 | A | 11/2000 | Killion |
| 6,173,059 | B1 | 1/2001 | Huang |
| 6,198,831 | B1 | 3/2001 | Azima |
| 6,205,224 | B1 | 3/2001 | Underbrink |
| 6,215,881 | B1 | 4/2001 | Azima |
| 6,266,427 | B1 | 7/2001 | Mathur |
| 6,285,770 | B1 | 9/2001 | Azima |
| 6,301,357 | B1 | 10/2001 | Romesburg |
| 6,329,908 | B1 | 12/2001 | Frecska |
| 6,332,029 | B1 | 12/2001 | Azima |
| D453,016 | S | 1/2002 | Nevill |
| 6,386,315 | B1 | 5/2002 | Roy |
| 6,393,129 | B1 | 5/2002 | Conrad |
| 6,424,635 | B1 | 7/2002 | Song |
| 6,442,272 | B1 | 8/2002 | Osovets |
| 6,449,593 | B1 | 9/2002 | Valve |
| 6,481,173 | B1 | 11/2002 | Roy |
| 6,488,367 | B1 | 12/2002 | Debesis |
| D469,090 | S | 1/2003 | Tsuji |
| 6,505,057 | B1 | 1/2003 | Finn |
| 6,507,659 | B1 | 1/2003 | Iredale |
| 6,510,919 | B1 | 1/2003 | Roy |
| 6,526,147 | B1 | 2/2003 | Rung |
| 6,556,682 | B1 | 4/2003 | Gilloire |
| 6,592,237 | B1 | 7/2003 | Pledger |
| 6,622,030 | B1 | 9/2003 | Romesburg |
| D480,923 | S | 10/2003 | Neubourg |
| 6,633,647 | B1 | 10/2003 | Markow |
| 6,665,971 | B2 | 12/2003 | Lowry |
| 6,694,028 | B1 | 2/2004 | Matsuo |
| 6,704,422 | B1 | 3/2004 | Jensen |
| D489,707 | S | 5/2004 | Kobayashi |
| 6,731,334 | B1 | 5/2004 | Maeng |
| 6,741,720 | B1 | 5/2004 | Myatt |
| 6,757,393 | B1 | 6/2004 | Spitzer |
| 6,768,795 | B2 | 7/2004 | Feltstroem |
| 6,868,377 | B1 | 3/2005 | Laroche |
| 6,885,750 | B2 | 4/2005 | Egelmeers |
| 6,885,986 | B1 | 4/2005 | Gigi |
| D504,889 | S | 5/2005 | Andre |
| 6,889,183 | B1 | 5/2005 | Gunduzhan |
| 6,895,093 | B1 | 5/2005 | Ali |
| 6,931,123 | B1 | 8/2005 | Hughes |
| 6,944,312 | B2 | 9/2005 | Mason |
| D510,729 | S | 10/2005 | Chen |
| 6,968,064 | B1 | 11/2005 | Ning |
| 6,990,193 | B2 | 1/2006 | Beaucoup |
| 6,993,126 | B1 | 1/2006 | Kyrylenko |
| 6,993,145 | B2 | 1/2006 | Combest |
| 7,003,099 | B1 | 2/2006 | Zhang |
| 7,013,267 | B1 | 3/2006 | Huart |
| 7,031,269 | B2 | 4/2006 | Lee |
| 7,035,398 | B2 | 4/2006 | Matsuo |
| 7,035,415 | B2 | 4/2006 | Belt |
| 7,050,576 | B2 | 5/2006 | Zhang |
| 7,054,451 | B2 | 5/2006 | Janse |
| D526,643 | S | 8/2006 | Ishizaki |
| D527,372 | S | 8/2006 | Allen |
| 7,092,516 | B2 | 8/2006 | Furuta |
| 7,092,882 | B2 | 8/2006 | Arrowood |
| 7,098,865 | B2 | 8/2006 | Christensen |
| 7,106,876 | B2 | 9/2006 | Santiago |
| 7,120,269 | B2 | 10/2006 | Lowell |
| 7,130,309 | B2 | 10/2006 | Boaz |
| D533,177 | S | 12/2006 | Andre |
| 7,149,320 | B2 | 12/2006 | Haykin |
| 7,161,534 | B2 | 1/2007 | Tsai |
| 7,187,765 | B2 | 3/2007 | Popovic |
| 7,203,308 | B2 | 4/2007 | Kubota |
| D542,543 | S | 5/2007 | Bruce |
| 7,212,628 | B2 | 5/2007 | Mirjana |
| D546,318 | S | 7/2007 | Yoon |
| D546,814 | S | 7/2007 | Takita |
| D547,748 | S | 7/2007 | Tsuge |
| 7,239,714 | B2 | 7/2007 | De Blok |
| D549,673 | S | 8/2007 | Niitsu |
| 7,269,263 | B2 | 9/2007 | Dedieu |
| D552,570 | S | 10/2007 | Niitsu |
| D559,553 | S | 1/2008 | James |
| 7,333,476 | B2 | 2/2008 | LeBlanc |
| D566,685 | S | 4/2008 | Koller |
| 7,359,504 | B1 | 4/2008 | Reuss |
| 7,366,310 | B2 | 4/2008 | Stinson |
| 7,387,151 | B1 | 6/2008 | Payne |
| 7,412,376 | B2 | 8/2008 | Florencio |
| 7,415,117 | B2 | 8/2008 | Tashev |
| D578,509 | S | 10/2008 | Thomas |
| D581,510 | S | 11/2008 | Albano |
| D582,391 | S | 12/2008 | Morimoto |
| D587,709 | S | 3/2009 | Niitsu |
| D589,605 | S | 3/2009 | Reedy |
| 7,503,616 | B2 | 3/2009 | Linhard |
| 7,515,719 | B2 | 4/2009 | Hooley |
| 7,536,769 | B2 | 5/2009 | Pedersen |
| D595,402 | S | 6/2009 | Miyake |
| D595,736 | S | 7/2009 | Son |
| 7,558,381 | B1 | 7/2009 | Ali |
| 7,561,700 | B1 | 7/2009 | Bernardi |
| 7,565,949 | B2 | 7/2009 | Tojo |
| D601,585 | S | 10/2009 | Andre |
| 7,651,390 | B1 | 1/2010 | Profeta |
| 7,660,428 | B2 | 2/2010 | Rodman |
| 7,667,728 | B2 | 2/2010 | Kenoyer |
| 7,672,445 | B1 | 3/2010 | Zhang |
| D613,338 | S | 4/2010 | Marukos |
| 7,701,110 | B2 | 4/2010 | Fukuda |
| 7,702,116 | B2 | 4/2010 | Stone |
| D614,871 | S | 5/2010 | Tang |
| 7,724,891 | B2 | 5/2010 | Beaucoup |
| D617,441 | S | 6/2010 | Koury |
| 7,747,001 | B2 | 6/2010 | Kellermann |
| 7,756,278 | B2 | 7/2010 | Moorer |
| 7,783,063 | B2 | 8/2010 | Pocino |
| 7,787,328 | B2 | 8/2010 | Chu |
| 7,830,862 | B2 | 11/2010 | James |
| 7,831,035 | B2 | 11/2010 | Stokes |
| 7,831,036 | B2 | 11/2010 | Beaucoup |
| 7,856,097 | B2 | 12/2010 | Tokuda |
| 7,881,486 | B1 | 2/2011 | Killion |
| 7,894,421 | B2 | 2/2011 | Kwan |

(56) References Cited

U.S. PATENT DOCUMENTS

D636,188 S 4/2011 Kim
7,925,006 B2 4/2011 Hirai
7,925,007 B2 4/2011 Stokes
7,936,886 B2 5/2011 Kim
7,970,123 B2 6/2011 Beaucoup
7,970,151 B2 6/2011 Oxford
D642,385 S 8/2011 Lee
D643,015 S 8/2011 Kim
7,991,167 B2 8/2011 Oxford
7,995,768 B2 8/2011 Miki
8,000,481 B2 8/2011 Nishikawa
8,005,238 B2 8/2011 Tashev
8,019,091 B2 9/2011 Burnett
8,041,054 B2 10/2011 Yeldener
8,059,843 B2 11/2011 Hung
8,064,629 B2 11/2011 Jiang
8,085,947 B2 12/2011 Haulick
8,085,949 B2 12/2011 Kim
8,095,120 B1 1/2012 Blair
8,098,842 B2 1/2012 Florencio
8,098,844 B2 1/2012 Elko
8,103,030 B2 1/2012 Barthel
8,109,360 B2 2/2012 Stewart, Jr.
8,112,272 B2 2/2012 Nagahama
8,116,500 B2 2/2012 Oxford
8,121,834 B2 2/2012 Rosec
D655,271 S 3/2012 Park
D656,473 S 3/2012 Laube
8,130,969 B2 3/2012 Buck
8,130,977 B2 3/2012 Chu
8,135,143 B2 3/2012 Ishibashi
8,144,886 B2 3/2012 Ishibashi
D658,153 S 4/2012 Woo
8,155,331 B2 4/2012 Nakadai
8,170,882 B2 5/2012 Davis
8,175,291 B2 5/2012 Chan
8,175,871 B2 5/2012 Wang
8,184,801 B1 5/2012 Hamalainen
8,189,765 B2 5/2012 Nishikawa
8,189,810 B2 5/2012 Wolff
8,194,863 B2 6/2012 Takumai
8,199,927 B1 6/2012 Raftery
8,204,198 B2 6/2012 Adeney
8,204,248 B2 6/2012 Haulick
8,208,664 B2 6/2012 Yasutaka
8,213,596 B2 7/2012 Beaucoup
8,213,634 B1 7/2012 Daniel
8,219,387 B2 7/2012 Cutler
8,229,134 B2 7/2012 Duraiswami
8,233,352 B2 7/2012 Beaucoup
8,243,951 B2 8/2012 Ishibashi
8,244,536 B2 8/2012 Arun
8,249,273 B2 8/2012 Inoda
8,259,959 B2 9/2012 Marton
8,275,120 B2 9/2012 Stokes, III
8,280,728 B2 10/2012 Chen
8,284,949 B2 10/2012 Farhang
8,284,952 B2 10/2012 Reining
8,286,749 B2 10/2012 Stewart
8,290,142 B1 10/2012 Lambert
8,291,670 B2 10/2012 Gard
8,297,402 B2 10/2012 Stewart
8,315,380 B2 11/2012 Liu
8,331,582 B2 12/2012 Steele
8,345,898 B2 1/2013 Reining
8,355,521 B2 1/2013 Larson
8,370,140 B2 2/2013 Guillaume
8,379,823 B2 2/2013 Ratmanski
8,385,557 B2 2/2013 Tashev
D678,329 S 3/2013 Lee
8,395,653 B2 3/2013 Feng
8,403,107 B2 3/2013 Stewart
8,406,436 B2 3/2013 Craven
8,428,661 B2 4/2013 Chen
8,433,061 B2 4/2013 Cutler
D682,266 S 5/2013 Wu
8,437,490 B2 5/2013 Marton
8,443,930 B2 5/2013 Stewart, Jr.
8,447,590 B2 5/2013 Ishibashi
8,472,639 B2 6/2013 Reining
8,472,640 B2 6/2013 Marton
D685,346 S 7/2013 Szymanski
D686,182 S 7/2013 Ashiwa
8,479,871 B2 7/2013 Stewart
8,483,398 B2 7/2013 Fozunbal
8,498,423 B2 7/2013 Thaden
D687,432 S 8/2013 Duan
8,503,653 B2 8/2013 Ahuja
8,515,089 B2 8/2013 Nicholson
8,515,109 B2 8/2013 Dittberner
8,526,633 B2 9/2013 Ukai
8,553,904 B2 10/2013 Said
8,559,611 B2 10/2013 Ratmanski
D693,328 S 11/2013 Goetzen
8,583,481 B2 11/2013 Walter
8,599,194 B2 12/2013 Lewis
8,600,443 B2 12/2013 Kawaguchi
8,605,890 B2 12/2013 Zhang
8,620,650 B2 12/2013 Walters
8,630,431 B2 1/2014 Gran
8,631,897 B2 1/2014 Stewart
8,634,569 B2 1/2014 Lu
8,638,951 B2 1/2014 Zurek
D699,712 S 2/2014 Bourne
8,644,477 B2 2/2014 Gilbert
8,654,955 B1 2/2014 Lambert
8,654,990 B2 2/2014 Faller
8,660,274 B2 2/2014 Wolff
8,660,275 B2 2/2014 Buck
8,670,581 B2 3/2014 Harman
8,672,087 B2 3/2014 Stewart
8,675,890 B2 3/2014 Schmidt
8,675,899 B2 3/2014 Jung
8,676,728 B1 3/2014 Velusamy
8,682,675 B2 3/2014 Togami
8,724,829 B2 5/2014 Visser
8,730,156 B2 5/2014 Weising
8,744,069 B2 6/2014 Cutler
8,744,101 B1 6/2014 Burns
8,755,536 B2 6/2014 Chen
8,787,560 B2 7/2014 Buck
8,811,601 B2 8/2014 Mohammad
8,818,002 B2 8/2014 Tashev
8,824,693 B2 9/2014 Åhgren
8,842,851 B2 9/2014 Beaucoup
8,855,326 B2 10/2014 Derkx
8,855,327 B2 10/2014 Tanaka
8,861,713 B2 10/2014 Xu
8,861,756 B2 10/2014 Zhu
8,873,789 B2 10/2014 Bigeh
D717,272 S 11/2014 Kim
8,886,343 B2 11/2014 Ishibashi
8,893,849 B2 11/2014 Hudson
8,898,633 B2 11/2014 Bryant
D718,731 S 12/2014 Lee
8,903,106 B2 12/2014 Meyer
8,923,529 B2 12/2014 McCowan
8,929,564 B2 1/2015 Kikkeri
8,942,382 B2 1/2015 Elko
8,965,546 B2 2/2015 Erik
D725,059 S 3/2015 Kim
D725,631 S 3/2015 McNamara
8,976,977 B2 3/2015 De
8,983,089 B1 3/2015 Chu
8,983,834 B2 3/2015 Davis
D726,144 S 4/2015 Kang
D727,968 S 4/2015 Onoue
9,002,028 B2 4/2015 Haulick
D729,767 S 5/2015 Lee
9,038,301 B2 5/2015 Zelbacher
9,088,336 B2 7/2015 Mani
9,094,496 B2 7/2015 Teutsch
D735,717 S 8/2015 Lam
D737,245 S 8/2015 Fan

(56) References Cited

U.S. PATENT DOCUMENTS

| | | | |
|---|---|---|---|
| 9,099,094 | B2 | 8/2015 | Burnett |
| 9,107,001 | B2 | 8/2015 | Diethorn |
| 9,111,543 | B2 | 8/2015 | Åhgren |
| 9,113,242 | B2 | 8/2015 | Hyun |
| 9,113,247 | B2 | 8/2015 | Chatlani |
| 9,126,827 | B2 | 9/2015 | Hsieh |
| 9,129,223 | B1 | 9/2015 | Velusamy |
| 9,140,054 | B2 | 9/2015 | Oberbroeckling |
| D740,279 | S | 10/2015 | Wu |
| 9,172,345 | B2 | 10/2015 | Kok |
| D743,376 | S | 11/2015 | Kim |
| D743,939 | S | 11/2015 | Seong |
| 9,196,261 | B2 | 11/2015 | Burnett |
| 9,197,974 | B1 | 11/2015 | Clark |
| 9,203,494 | B2 | 12/2015 | Tarighat Mehrabani |
| 9,215,327 | B2 | 12/2015 | Bathurst |
| 9,215,543 | B2 | 12/2015 | Sun |
| 9,226,062 | B2 | 12/2015 | Sun |
| 9,226,070 | B2 | 12/2015 | Hyun |
| 9,226,088 | B2 | 12/2015 | Pandey |
| 9,232,185 | B2 | 1/2016 | Graham |
| 9,237,391 | B2 | 1/2016 | Benesty |
| 9,247,367 | B2 | 1/2016 | Nobile |
| 9,253,567 | B2 | 2/2016 | Morcelli |
| 9,257,132 | B2 | 2/2016 | Gowreesunker |
| 9,264,553 | B2 | 2/2016 | Pandey |
| 9,264,805 | B2 | 2/2016 | Buck |
| 9,280,985 | B2 | 3/2016 | Tawada |
| 9,286,908 | B2 | 3/2016 | Zhang |
| 9,294,839 | B2 | 3/2016 | Lambert |
| 9,301,049 | B2 | 3/2016 | Elko |
| D754,103 | S | 4/2016 | Fischer |
| 9,307,326 | B2 | 4/2016 | Elko |
| 9,319,532 | B2 | 4/2016 | Bao |
| 9,319,799 | B2 | 4/2016 | Salmon |
| 9,326,060 | B2 | 4/2016 | Nicholson |
| D756,502 | S | 5/2016 | Lee |
| 9,330,673 | B2 | 5/2016 | Cho |
| 9,338,301 | B2 | 5/2016 | Pocino |
| 9,338,549 | B2 | 5/2016 | Haulick |
| 9,354,310 | B2 | 5/2016 | Erik |
| 9,357,080 | B2 | 5/2016 | Beaucoup |
| 9,403,670 | B2 | 8/2016 | Schelling |
| 9,426,598 | B2 | 8/2016 | Walsh |
| D767,748 | S | 9/2016 | Nakai |
| 9,451,078 | B2 | 9/2016 | Yang |
| D769,239 | S | 10/2016 | Li |
| 9,462,378 | B2 | 10/2016 | Kuech |
| 9,473,868 | B2 | 10/2016 | Huang |
| 9,479,627 | B1 | 10/2016 | Rung |
| 9,479,885 | B1 | 10/2016 | Ivanov |
| 9,489,948 | B1 | 11/2016 | Chu |
| 9,510,090 | B2 | 11/2016 | Lissek |
| 9,514,723 | B2 | 12/2016 | Silfvast |
| 9,516,412 | B2 | 12/2016 | Shigenaga |
| 9,521,057 | B2 | 12/2016 | Klingbeil |
| 9,549,245 | B2 | 1/2017 | Frater |
| 9,560,446 | B1 | 1/2017 | Chang |
| 9,560,451 | B2 | 1/2017 | Eichfeld |
| 9,565,493 | B2 | 2/2017 | Abraham |
| 9,578,413 | B2 | 2/2017 | Sawa |
| 9,578,440 | B2 | 2/2017 | Otto |
| 9,589,556 | B2 | 3/2017 | Gao |
| 9,591,123 | B2 | 3/2017 | Sorensen |
| 9,591,404 | B1 | 3/2017 | Chhetri |
| D784,299 | S | 4/2017 | Cho |
| 9,615,173 | B2 | 4/2017 | Sako |
| 9,628,596 | B1 | 4/2017 | Bullough |
| 9,635,186 | B2 | 4/2017 | Pandey |
| 9,635,474 | B2 | 4/2017 | Kuster |
| D787,481 | S | 5/2017 | Jorunn |
| D788,073 | S | 5/2017 | Silvera |
| 9,640,187 | B2 | 5/2017 | Niemisto |
| 9,641,688 | B2 | 5/2017 | Pandey |
| 9,641,929 | B2 | 5/2017 | Li |
| 9,641,935 | B1 | 5/2017 | Ivanov |
| 9,653,091 | B2 | 5/2017 | Matsuo |
| 9,653,092 | B2 | 5/2017 | Sun |
| 9,655,001 | B2 | 5/2017 | Metzger |
| 9,659,576 | B1 | 5/2017 | Kotvis |
| D789,323 | S | 6/2017 | Mackiewicz |
| 9,674,604 | B2 | 6/2017 | Deroo |
| 9,692,882 | B2 | 6/2017 | Mani |
| 9,706,057 | B2 | 7/2017 | Mani |
| 9,716,944 | B2 | 7/2017 | Yliaho |
| 9,721,582 | B1 | 8/2017 | Huang |
| 9,734,835 | B2 | 8/2017 | Fujieda |
| 9,754,572 | B2 | 9/2017 | Salazar |
| 9,761,243 | B2 | 9/2017 | Taenzer |
| D801,285 | S | 10/2017 | Timmins |
| 9,788,119 | B2 | 10/2017 | Miikka |
| 9,813,806 | B2 | 11/2017 | Graham |
| 9,818,426 | B2 | 11/2017 | Kotera |
| 9,826,211 | B2 | 11/2017 | Sawa |
| 9,854,101 | B2 | 12/2017 | Pandey |
| 9,854,363 | B2 | 12/2017 | Sladeczek |
| 9,860,439 | B2 | 1/2018 | Sawa |
| 9,866,952 | B2 | 1/2018 | Pandey |
| D811,393 | S | 2/2018 | Ahn |
| 9,894,434 | B2 | 2/2018 | Rollow, IV |
| 9,930,448 | B1 | 3/2018 | Chen |
| 9,936,290 | B2 | 4/2018 | Mohammad |
| 9,966,059 | B1 | 5/2018 | Ayrapetian |
| 9,973,848 | B2 | 5/2018 | Chhetri |
| 9,980,042 | B1 | 5/2018 | Benattar |
| D819,607 | S | 6/2018 | Chui |
| D819,631 | S | 6/2018 | Matsumiya |
| 10,015,589 | B1 | 7/2018 | Ebenezer |
| 10,021,506 | B2 | 7/2018 | Johnson |
| 10,021,515 | B1 | 7/2018 | Mallya |
| 10,034,116 | B2 | 7/2018 | Kadri |
| 10,038,769 | B2 | 7/2018 | Ukai |
| 10,054,320 | B2 | 8/2018 | Choi |
| 10,061,009 | B1 | 8/2018 | Family |
| 10,062,379 | B2 | 8/2018 | Katuri |
| 10,153,744 | B1 | 12/2018 | Every |
| 10,165,386 | B2 | 12/2018 | Lehtiniemi |
| D841,589 | S | 2/2019 | Böhmer |
| 10,206,030 | B2 | 2/2019 | Matsumoto |
| 10,210,882 | B1 | 2/2019 | McCowan |
| 10,231,062 | B2 | 3/2019 | Pedersen |
| 10,244,121 | B2 | 3/2019 | Mani |
| 10,244,219 | B2 | 3/2019 | Sawa |
| 10,269,343 | B2 | 4/2019 | Wingate |
| 10,366,702 | B2 | 7/2019 | Morton |
| 10,367,948 | B2 | 7/2019 | Wells-Rutherford |
| D857,873 | S | 8/2019 | Shimada |
| 10,389,861 | B2 | 8/2019 | Mani |
| 10,389,885 | B2 | 8/2019 | Sun |
| D860,319 | S | 9/2019 | Beruto |
| D860,997 | S | 9/2019 | Jhun |
| D864,136 | S | 10/2019 | Kim |
| 10,440,469 | B2 | 10/2019 | Barnett |
| D865,723 | S | 11/2019 | Cho |
| 10,566,008 | B2 | 2/2020 | Thorpe |
| 10,602,267 | B2 | 3/2020 | Grosche |
| D883,952 | S | 5/2020 | Lucas |
| 10,650,797 | B2 | 5/2020 | Kumar |
| D888,020 | S | 6/2020 | Lyu |
| 10,728,653 | B2 | 7/2020 | Graham |
| D900,070 | S | 10/2020 | Lantz |
| D900,071 | S | 10/2020 | Lantz |
| D900,072 | S | 10/2020 | Lantz |
| D900,073 | S | 10/2020 | Lantz |
| D900,074 | S | 10/2020 | Lantz |
| 10,827,263 | B2 | 11/2020 | Christoph |
| 10,863,270 | B1 | 12/2020 | O'Neill |
| 10,930,297 | B2 | 2/2021 | Christoph |
| 10,959,018 | B1 | 3/2021 | Shi |
| 10,979,805 | B2 | 4/2021 | Chowdhary |
| D924,189 | S | 7/2021 | Park |
| 11,109,133 | B2 | 8/2021 | Lantz |
| D940,116 | S | 1/2022 | Cho |
| 11,218,802 | B1 | 1/2022 | Kandadai |

(56) References Cited

U.S. PATENT DOCUMENTS

| | | | |
|---|---|---|---|
| 2001/0031058 | A1 | 10/2001 | Anderson |
| 2002/0015500 | A1 | 2/2002 | Belt |
| 2002/0041679 | A1 | 4/2002 | Beaucoup |
| 2002/0048377 | A1 | 4/2002 | Vaudrey |
| 2002/0064158 | A1 | 5/2002 | Yokoyama |
| 2002/0064287 | A1 | 5/2002 | Kawamura |
| 2002/0069054 | A1 | 6/2002 | Arrowood |
| 2002/0110255 | A1 | 8/2002 | Killion |
| 2002/0126861 | A1 | 9/2002 | Colby |
| 2002/0131580 | A1 | 9/2002 | Smith |
| 2002/0140633 | A1 | 10/2002 | Rafii |
| 2002/0146282 | A1 | 10/2002 | Wilkes |
| 2002/0149070 | A1 | 10/2002 | Sheplak |
| 2002/0159603 | A1 | 10/2002 | Hirai |
| 2003/0026437 | A1 | 2/2003 | Janse |
| 2003/0053639 | A1 | 3/2003 | Beaucoup |
| 2003/0059061 | A1 | 3/2003 | Tsuji |
| 2003/0063762 | A1 | 4/2003 | Tajima |
| 2003/0063768 | A1 | 4/2003 | Cornelius |
| 2003/0072461 | A1 | 4/2003 | Moorer |
| 2003/0107478 | A1 | 6/2003 | Hendricks |
| 2003/0118200 | A1 | 6/2003 | Beaucoup |
| 2003/0122777 | A1 | 7/2003 | Grover |
| 2003/0138119 | A1 | 7/2003 | Pocino |
| 2003/0156725 | A1 | 8/2003 | Boone |
| 2003/0161485 | A1 | 8/2003 | Smith |
| 2003/0163326 | A1 | 8/2003 | Maase |
| 2003/0169888 | A1 | 9/2003 | Subotic |
| 2003/0185404 | A1 | 10/2003 | Milsap |
| 2003/0198339 | A1 | 10/2003 | Roy |
| 2003/0198359 | A1 | 10/2003 | Killion |
| 2003/0202107 | A1 | 10/2003 | Slattery |
| 2004/0013038 | A1 | 1/2004 | Kajala |
| 2004/0013252 | A1 | 1/2004 | Craner |
| 2004/0076305 | A1 | 4/2004 | Santiago |
| 2004/0105557 | A1 | 6/2004 | Matsuo |
| 2004/0125942 | A1 | 7/2004 | Beaucoup |
| 2004/0175006 | A1 | 9/2004 | Kim |
| 2004/0202345 | A1 | 10/2004 | Stenberg |
| 2004/0240664 | A1 | 12/2004 | Freed |
| 2005/0005494 | A1 | 1/2005 | Way |
| 2005/0041530 | A1 | 2/2005 | Goudie |
| 2005/0069156 | A1 | 3/2005 | Haapapuro |
| 2005/0094580 | A1 | 5/2005 | Kumar |
| 2005/0094795 | A1 | 5/2005 | Rambo |
| 2005/0149320 | A1 | 7/2005 | Kajala |
| 2005/0157897 | A1 | 7/2005 | Saltykov |
| 2005/0175189 | A1 | 8/2005 | Lee |
| 2005/0175190 | A1 | 8/2005 | Tashev |
| 2005/0213747 | A1 | 9/2005 | Popovich |
| 2005/0221867 | A1 | 10/2005 | Zurek |
| 2005/0238196 | A1 | 10/2005 | Furuno |
| 2005/0270906 | A1 | 12/2005 | Ramenzoni |
| 2005/0271221 | A1 | 12/2005 | Cerwin |
| 2005/0286698 | A1 | 12/2005 | Bathurst |
| 2005/0286729 | A1 | 12/2005 | Harwood |
| 2006/0083390 | A1 | 4/2006 | Kaderavek |
| 2006/0088173 | A1 | 4/2006 | Rodman |
| 2006/0093128 | A1 | 5/2006 | Oxford |
| 2006/0098403 | A1 | 5/2006 | Smith |
| 2006/0104458 | A1 | 5/2006 | Kenoyer |
| 2006/0109983 | A1 | 5/2006 | Young |
| 2006/0151256 | A1 | 7/2006 | Lee |
| 2006/0159293 | A1 | 7/2006 | Azima |
| 2006/0161430 | A1 | 7/2006 | Schweng |
| 2006/0165242 | A1 | 7/2006 | Miki |
| 2006/0192976 | A1 | 8/2006 | Hall |
| 2006/0198541 | A1 | 9/2006 | Henry |
| 2006/0204022 | A1 | 9/2006 | Hooley |
| 2006/0215866 | A1 | 9/2006 | Francisco |
| 2006/0222187 | A1 | 10/2006 | Jarrett |
| 2006/0233353 | A1 | 10/2006 | Beaucoup |
| 2006/0239471 | A1 | 10/2006 | Mao |
| 2006/0262942 | A1 | 11/2006 | Oxford |
| 2006/0269080 | A1 | 11/2006 | Oxford |
| 2006/0269086 | A1 | 11/2006 | Page |
| 2007/0006474 | A1 | 1/2007 | Taniguchi |
| 2007/0009116 | A1 | 1/2007 | Reining |
| 2007/0019828 | A1 | 1/2007 | Hughes |
| 2007/0053524 | A1 | 3/2007 | Haulick |
| 2007/0093714 | A1 | 4/2007 | Beaucoup |
| 2007/0116255 | A1 | 5/2007 | Derkx |
| 2007/0120029 | A1 | 5/2007 | Keung |
| 2007/0165871 | A1 | 7/2007 | Roovers |
| 2007/0230712 | A1 | 10/2007 | Belt |
| 2007/0253561 | A1 | 11/2007 | Williams |
| 2007/0269066 | A1 | 11/2007 | Derleth |
| 2008/0008339 | A1 | 1/2008 | Ryan |
| 2008/0033723 | A1 | 2/2008 | Jang |
| 2008/0046235 | A1 | 2/2008 | Chen |
| 2008/0056517 | A1 | 3/2008 | Algazi |
| 2008/0101622 | A1 | 5/2008 | Sugiyama |
| 2008/0130907 | A1 | 6/2008 | Sudo |
| 2008/0144848 | A1 | 6/2008 | Buck |
| 2008/0168283 | A1 | 7/2008 | Penning |
| 2008/0188965 | A1 | 8/2008 | Bruey |
| 2008/0212805 | A1 | 9/2008 | Fincham |
| 2008/0232607 | A1 | 9/2008 | Tashev |
| 2008/0247567 | A1 | 10/2008 | Morgan |
| 2008/0253553 | A1 | 10/2008 | Li |
| 2008/0253589 | A1 | 10/2008 | Trahms |
| 2008/0259731 | A1 | 10/2008 | Happonen |
| 2008/0260175 | A1 | 10/2008 | Elko |
| 2008/0279400 | A1 | 11/2008 | Knoll |
| 2008/0285772 | A1 | 11/2008 | Haulick |
| 2009/0003586 | A1 | 1/2009 | Lai |
| 2009/0030536 | A1 | 1/2009 | Gur |
| 2009/0052684 | A1 | 2/2009 | Ishibashi |
| 2009/0086998 | A1 | 4/2009 | Jeong |
| 2009/0087000 | A1 | 4/2009 | Ko |
| 2009/0087001 | A1 | 4/2009 | Jiang |
| 2009/0094817 | A1 | 4/2009 | Killion |
| 2009/0129609 | A1 | 5/2009 | Oh |
| 2009/0147967 | A1 | 6/2009 | Ishibashi |
| 2009/0150149 | A1 | 6/2009 | Cutter |
| 2009/0161880 | A1 | 6/2009 | Hooley |
| 2009/0169027 | A1 | 7/2009 | Ura |
| 2009/0173030 | A1 | 7/2009 | Gulbrandsen |
| 2009/0173570 | A1 | 7/2009 | Levit |
| 2009/0226004 | A1 | 9/2009 | Soerensen |
| 2009/0233545 | A1 | 9/2009 | Sutskover |
| 2009/0237561 | A1 | 9/2009 | Kobayashi |
| 2009/0254340 | A1 | 10/2009 | Sun |
| 2009/0274318 | A1 | 11/2009 | Ishibashi |
| 2009/0310794 | A1 | 12/2009 | Ishibashi |
| 2010/0011644 | A1 | 1/2010 | Kramer |
| 2010/0034397 | A1 | 2/2010 | Nakadai |
| 2010/0074433 | A1 | 3/2010 | Zhang |
| 2010/0111323 | A1 | 5/2010 | Marton |
| 2010/0111324 | A1 | 5/2010 | Yeldener |
| 2010/0119097 | A1 | 5/2010 | Ohtsuka |
| 2010/0123785 | A1 | 5/2010 | Chen |
| 2010/0128892 | A1 | 5/2010 | Chen |
| 2010/0128901 | A1 | 5/2010 | Herman |
| 2010/0131749 | A1 | 5/2010 | Kim |
| 2010/0142721 | A1 | 6/2010 | Wada |
| 2010/0150364 | A1 | 6/2010 | Buck |
| 2010/0158268 | A1 | 6/2010 | Marton |
| 2010/0165071 | A1 | 7/2010 | Ishibashi |
| 2010/0166219 | A1 | 7/2010 | Marton |
| 2010/0189275 | A1 | 7/2010 | Christoph |
| 2010/0189299 | A1 | 7/2010 | Grant |
| 2010/0202628 | A1 | 8/2010 | Meyer |
| 2010/0208605 | A1 | 8/2010 | Wang |
| 2010/0215184 | A1 | 8/2010 | Buck |
| 2010/0215189 | A1 | 8/2010 | Marton |
| 2010/0217590 | A1 | 8/2010 | Nemer |
| 2010/0245624 | A1 | 9/2010 | Beaucoup |
| 2010/0246873 | A1 | 9/2010 | Chen |
| 2010/0284185 | A1 | 11/2010 | Ngai |
| 2010/0305728 | A1 | 12/2010 | Aiso |
| 2010/0314513 | A1 | 12/2010 | Evans |
| 2011/0002469 | A1 | 1/2011 | Ojala |
| 2011/0007921 | A1 | 1/2011 | Stewart |

(56) References Cited

U.S. PATENT DOCUMENTS

2011/0033063 A1 2/2011 McGrath
2011/0038229 A1 2/2011 Beaucoup
2011/0096136 A1 4/2011 Liu
2011/0096631 A1 4/2011 Kondo
2011/0096915 A1 4/2011 Nemer
2011/0164761 A1 7/2011 McCowan
2011/0194719 A1 8/2011 Frater
2011/0211706 A1 9/2011 Tanaka
2011/0235821 A1 9/2011 Okita
2011/0268287 A1 11/2011 Ishibashi
2011/0311064 A1 12/2011 Teutsch
2011/0311085 A1 12/2011 Stewart
2011/0317862 A1 12/2011 Hosoe
2012/0002835 A1 1/2012 Stewart
2012/0014049 A1 1/2012 Ogle
2012/0027227 A1 2/2012 Kok
2012/0070015 A1 3/2012 Oh
2012/0076316 A1 3/2012 Zhu
2012/0080260 A1 4/2012 Stewart
2012/0093344 A1 4/2012 Sun
2012/0117474 A1 5/2012 Miki
2012/0128160 A1 5/2012 Kim
2012/0128175 A1 5/2012 Visser
2012/0155688 A1 6/2012 Wilson
2012/0155703 A1 6/2012 Hernandez-Abrego
2012/0163625 A1 6/2012 Siotis
2012/0169826 A1 7/2012 Jeong
2012/0177219 A1 7/2012 Mullen
2012/0182429 A1 7/2012 Forutanpour
2012/0207335 A1 8/2012 Spaanderman
2012/0224709 A1 9/2012 Keddem
2012/0243698 A1* 9/2012 Elko .................... H04M 9/082 381/66
2012/0262536 A1 10/2012 Chen
2012/0263019 A1 10/2012 Armstong-Muntner
2012/0288079 A1 11/2012 Burnett
2012/0288114 A1 11/2012 Duraiswami
2012/0294472 A1 11/2012 Hudson
2012/0327115 A1 12/2012 Chhetri
2012/0328142 A1 12/2012 Horibe
2013/0002797 A1 1/2013 Thapa
2013/0004013 A1 1/2013 Stewart
2013/0015014 A1 1/2013 Stewart
2013/0016847 A1 1/2013 Steiner
2013/0028451 A1 1/2013 De Roo
2013/0029684 A1 1/2013 Kawaguchi
2013/0034241 A1 2/2013 Pandey
2013/0039504 A1 2/2013 Pandey
2013/0083911 A1 4/2013 Bathurst
2013/0094689 A1 4/2013 Tanaka
2013/0101141 A1 4/2013 McElveen
2013/0136274 A1 5/2013 Per
2013/0142343 A1 6/2013 Matsui
2013/0147835 A1 6/2013 Lee
2013/0156198 A1 6/2013 Kim
2013/0182190 A1 7/2013 McCartney
2013/0206501 A1 8/2013 Yu
2013/0216066 A1 8/2013 Yerrace
2013/0226593 A1 8/2013 Magnusson
2013/0251181 A1 9/2013 Stewart
2013/0264144 A1 10/2013 Hudson
2013/0271559 A1 10/2013 Feng
2013/0294616 A1 11/2013 Mulder
2013/0297302 A1 11/2013 Pan
2013/0304476 A1 11/2013 Kim
2013/0304479 A1 11/2013 Teller
2013/0329908 A1 12/2013 Lindahl
2013/0332156 A1 12/2013 Tackin
2013/0336516 A1 12/2013 Stewart
2013/0343549 A1 12/2013 Vemireddy
2014/0003635 A1 1/2014 Mohammad
2014/0010383 A1 1/2014 Mackey
2014/0016794 A1 1/2014 Lu
2014/0029761 A1 1/2014 Maenpaa
2014/0037097 A1 2/2014 Mark
2014/0050332 A1 2/2014 Nielsen
2014/0072151 A1 3/2014 Ochs
2014/0098233 A1 4/2014 Martin
2014/0098964 A1 4/2014 Rosca
2014/0122060 A1 5/2014 Kaszczuk
2014/0126746 A1 5/2014 Shin
2014/0177857 A1 6/2014 Kuster
2014/0233777 A1 8/2014 Tseng
2014/0233778 A1 8/2014 Hardiman
2014/0264654 A1 9/2014 Salmon
2014/0265774 A1 9/2014 Stewart
2014/0270271 A1 9/2014 Dehe
2014/0286518 A1 9/2014 Stewart
2014/0295768 A1 10/2014 Wu
2014/0301586 A1 10/2014 Stewart
2014/0307882 A1 10/2014 Leblanc
2014/0314251 A1 10/2014 Rosca
2014/0341392 A1 11/2014 Lambert
2014/0357177 A1 12/2014 Stewart
2014/0363008 A1 12/2014 Chen
2015/0003638 A1 1/2015 Kasai
2015/0025878 A1 1/2015 Gowreesunker
2015/0030172 A1 1/2015 Gaensler
2015/0033042 A1 1/2015 Iwamoto
2015/0050967 A1 2/2015 Bao
2015/0055796 A1 2/2015 Nugent
2015/0055797 A1 2/2015 Nguyen
2015/0063579 A1 3/2015 Bao
2015/0070188 A1 3/2015 Aramburu
2015/0078581 A1 3/2015 Etter
2015/0078582 A1 3/2015 Graham
2015/0097719 A1 4/2015 Balachandreswaran
2015/0104023 A1 4/2015 Bilobrov
2015/0117672 A1 4/2015 Christoph
2015/0118960 A1 4/2015 Petit
2015/0126255 A1 5/2015 Yang
2015/0156578 A1 6/2015 Alexandridis
2015/0163577 A1 6/2015 Benesty
2015/0185825 A1 7/2015 Mullins
2015/0189423 A1 7/2015 Giannuzzi
2015/0208171 A1 7/2015 Funakoshi
2015/0237424 A1 8/2015 Wilker
2015/0281832 A1 10/2015 Kishimoto
2015/0281833 A1 10/2015 Shigenaga
2015/0281834 A1 10/2015 Takano
2015/0312662 A1 10/2015 Kishimoto
2015/0312691 A1 10/2015 Jussi
2015/0326968 A1 11/2015 Shigenaga
2015/0341734 A1 11/2015 Sherman
2015/0350621 A1 12/2015 Sawa
2015/0358734 A1 12/2015 Butler
2016/0011851 A1 1/2016 Zhang
2016/0021478 A1 1/2016 Katagiri
2016/0029120 A1 1/2016 Nesta
2016/0031700 A1 2/2016 Sparks
2016/0037277 A1 2/2016 Matsumoto
2016/0055859 A1 2/2016 Finlow-Bates
2016/0080867 A1 3/2016 Nugent
2016/0088392 A1 3/2016 Huttunen
2016/0100092 A1 4/2016 Bohac
2016/0105473 A1 4/2016 Klingbeil
2016/0111109 A1 4/2016 Tsujikawa
2016/0127527 A1 5/2016 Mani
2016/0134928 A1 5/2016 Ogle
2016/0142548 A1 5/2016 Pandey
2016/0142814 A1 5/2016 Deroo
2016/0142815 A1 5/2016 Norris
2016/0148057 A1 5/2016 Oh
2016/0150315 A1 5/2016 Tzirkel-Hancock
2016/0150316 A1 5/2016 Kubota
2016/0155455 A1 6/2016 Petteri
2016/0165340 A1 6/2016 Benattar
2016/0173976 A1 6/2016 Podhradsky
2016/0173978 A1 6/2016 Li
2016/0189727 A1 6/2016 Wu
2016/0192068 A1 6/2016 Ng
2016/0196836 A1 7/2016 Yu
2016/0234593 A1 8/2016 Matsumoto
2016/0249132 A1 8/2016 Oliaei

(56) References Cited

U.S. PATENT DOCUMENTS

| | | | |
|---|---|---|---|
| 2016/0275961 | A1 | 9/2016 | Yu |
| 2016/0295279 | A1 | 10/2016 | Srinivasan |
| 2016/0300584 | A1 | 10/2016 | Pandey |
| 2016/0302002 | A1 | 10/2016 | Lambert |
| 2016/0302006 | A1 | 10/2016 | Pandey |
| 2016/0323667 | A1 | 11/2016 | Shumard |
| 2016/0323668 | A1 | 11/2016 | Abraham |
| 2016/0330545 | A1 | 11/2016 | Mcelveen |
| 2016/0337523 | A1 | 11/2016 | Pandey |
| 2016/0353200 | A1 | 12/2016 | Bigeh |
| 2016/0357508 | A1 | 12/2016 | Moore |
| 2017/0019744 | A1 | 1/2017 | Matsumoto |
| 2017/0064451 | A1 | 3/2017 | Park |
| 2017/0105066 | A1 | 4/2017 | McLaughlin |
| 2017/0134849 | A1 | 5/2017 | Pandey |
| 2017/0134850 | A1 | 5/2017 | Graham |
| 2017/0164101 | A1 | 6/2017 | Rollow, IV |
| 2017/0180861 | A1 | 6/2017 | Chen |
| 2017/0206064 | A1 | 7/2017 | Breazeal |
| 2017/0230748 | A1 | 8/2017 | Shumard |
| 2017/0264999 | A1 | 9/2017 | Fukuda |
| 2017/0303887 | A1 | 10/2017 | Richmond |
| 2017/0308352 | A1 | 10/2017 | Kessler |
| 2017/0374454 | A1 | 12/2017 | Bernardini |
| 2018/0083848 | A1 | 3/2018 | Siddiqi |
| 2018/0102136 | A1 | 4/2018 | Ebenezer |
| 2018/0109873 | A1 | 4/2018 | Xiang |
| 2018/0115799 | A1 | 4/2018 | Thiele |
| 2018/0160224 | A1 | 6/2018 | Graham |
| 2018/0196585 | A1 | 7/2018 | Densham |
| 2018/0219922 | A1 | 8/2018 | Bryans |
| 2018/0227666 | A1 | 8/2018 | Barnett |
| 2018/0292079 | A1 | 10/2018 | Branham |
| 2018/0310096 | A1 | 10/2018 | Shumard |
| 2018/0313558 | A1 | 11/2018 | Byers |
| 2018/0338205 | A1 | 11/2018 | Abraham |
| 2018/0359565 | A1 | 12/2018 | Kim |
| 2019/0042187 | A1 | 2/2019 | Truong |
| 2019/0166424 | A1 | 5/2019 | Harney |
| 2019/0182607 | A1 | 6/2019 | Pedersen |
| 2019/0215540 | A1 | 7/2019 | Nicol |
| 2019/0230436 | A1 | 7/2019 | Tsingos |
| 2019/0259408 | A1 | 8/2019 | Freeman |
| 2019/0268683 | A1 | 8/2019 | Miyahara |
| 2019/0295540 | A1 | 9/2019 | Grima |
| 2019/0295569 | A1 | 9/2019 | Wang |
| 2019/0319677 | A1 | 10/2019 | Hansen |
| 2019/0371354 | A1 | 12/2019 | Lester |
| 2019/0373362 | A1 | 12/2019 | Ansai |
| 2019/0385629 | A1 | 12/2019 | Moravy |
| 2019/0387311 | A1 | 12/2019 | Schultz |
| 2020/0015021 | A1 | 1/2020 | Leppanen |
| 2020/0021910 | A1 | 1/2020 | Rollow, IV |
| 2020/0027472 | A1 | 1/2020 | Huang |
| 2020/0037068 | A1 | 1/2020 | Barnett |
| 2020/0068297 | A1 | 2/2020 | Rollow, IV |
| 2020/0100009 | A1 | 3/2020 | Lantz |
| 2020/0100025 | A1 | 3/2020 | Shumard |
| 2020/0107137 | A1 | 4/2020 | Koutrouli |
| 2020/0137485 | A1 | 4/2020 | Yamakawa |
| 2020/0145753 | A1 | 5/2020 | Rollow, IV |
| 2020/0152218 | A1 | 5/2020 | Kikuhara |
| 2020/0162618 | A1 | 5/2020 | Enteshari |
| 2020/0228663 | A1 | 7/2020 | Wells-Rutherford |
| 2020/0251119 | A1 | 8/2020 | Yang |
| 2020/0275204 | A1 | 8/2020 | Labosco |
| 2020/0278043 | A1 | 9/2020 | Cao |
| 2020/0288237 | A1 | 9/2020 | Abraham |
| 2021/0012789 | A1 | 1/2021 | Husain |
| 2021/0021940 | A1 | 1/2021 | Petersen |
| 2021/0044881 | A1 | 2/2021 | Lantz |
| 2021/0051397 | A1 | 2/2021 | Veselinovic |
| 2021/0098014 | A1 | 4/2021 | Tanaka |
| 2021/0098015 | A1 | 4/2021 | Pandey |
| 2021/0120335 | A1 | 4/2021 | Veselinovic |
| 2021/0200504 | A1 | 7/2021 | Park |
| 2021/0375298 | A1 | 12/2021 | Zhang |

FOREIGN PATENT DOCUMENTS

| | | | |
|---|---|---|---|
| CA | 2475283 | | 1/2005 |
| CA | 2505496 | | 10/2006 |
| CA | 2838856 | | 12/2012 |
| CA | 2846323 | | 9/2014 |
| CN | 1780495 | | 5/2006 |
| CN | 101217830 | | 7/2008 |
| CN | 101833954 | | 9/2010 |
| CN | 101860776 | | 10/2010 |
| CN | 101894558 | | 11/2010 |
| CN | 102646418 | | 8/2012 |
| CN | 102821336 | | 12/2012 |
| CN | 102833664 | | 12/2012 |
| CN | 102860039 | | 1/2013 |
| CN | 104036784 | | 9/2014 |
| CN | 104053088 | | 9/2014 |
| CN | 104080289 | A1 | 10/2014 |
| CN | 104347076 | | 2/2015 |
| CN | 104581463 | | 4/2015 |
| CN | 105355210 | | 2/2016 |
| CN | 105548998 | | 5/2016 |
| CN | 106162427 | | 11/2016 |
| CN | 106233751 | | 12/2016 |
| CN | 106251857 | | 12/2016 |
| CN | 106851036 | | 6/2017 |
| CN | 107221336 | | 9/2017 |
| CN | 107534725 | | 1/2018 |
| CN | 108172235 | | 6/2018 |
| CN | 109087664 | | 12/2018 |
| CN | 208190895 | | 12/2018 |
| CN | 109727604 | | 5/2019 |
| CN | 110010147 | | 7/2019 |
| CN | 306391029 | | 3/2021 |
| DE | 2941485 | | 4/1981 |
| EM | 0077546430001 | | 3/2020 |
| EP | 0381498 | | 8/1990 |
| EP | 0594098 | | 4/1994 |
| EP | 0869697 | | 10/1998 |
| EP | 1180914 | | 2/2002 |
| EP | 1184676 | | 3/2002 |
| EP | 0944228 | | 6/2003 |
| EP | 1439526 | | 7/2004 |
| EP | 1651001 | | 4/2006 |
| EP | 1727344 | | 11/2006 |
| EP | 1906707 | | 4/2008 |
| EP | 1952393 | | 8/2008 |
| EP | 1962547 | | 8/2008 |
| EP | 2133867 | | 12/2009 |
| EP | 2159789 | | 3/2010 |
| EP | 2197219 | | 6/2010 |
| EP | 2360940 | | 8/2011 |
| EP | 2710788 | | 3/2014 |
| EP | 2721837 | | 4/2014 |
| EP | 2772910 | | 9/2014 |
| EP | 2778310 | | 9/2014 |
| EP | 2802157 | | 11/2014 |
| EP | 2942975 | | 11/2015 |
| EP | 2988527 | | 2/2016 |
| EP | 3035556 | | 6/2016 |
| EP | 3131311 | | 2/2017 |
| GB | 2393601 | | 3/2004 |
| GB | 2446620 | | 8/2008 |
| GB | 2512155 | | 9/2014 |
| GB | 2563857 | | 1/2019 |
| JP | S63144699 | | 6/1988 |
| JP | H01260967 | | 10/1989 |
| JP | H0241099 | | 2/1990 |
| JP | H05260589 | | 10/1993 |
| JP | H07336790 | | 12/1995 |
| JP | 2518823 | | 7/1996 |
| JP | 3175622 | | 6/2001 |
| JP | 2003060530 | | 2/2003 |
| JP | 2003087890 | | 3/2003 |
| JP | 2004349806 | | 12/2004 |

(56) References Cited

FOREIGN PATENT DOCUMENTS

| | | |
|---|---|---|
| JP | 2004537232 | 12/2004 |
| JP | 2005323084 | 11/2005 |
| JP | 2006067127 | 3/2006 |
| JP | 2006094389 | 4/2006 |
| JP | 2006101499 | 4/2006 |
| JP | 4120646 | 8/2006 |
| JP | 4258472 | 8/2006 |
| JP | 4196956 | 9/2006 |
| JP | 2006340151 | 12/2006 |
| JP | 4760160 | 1/2007 |
| JP | 4752403 | 3/2007 |
| JP | 2007089058 | 4/2007 |
| JP | 4867579 | 6/2007 |
| JP | 2007208503 | 8/2007 |
| JP | 2007228069 | 9/2007 |
| JP | 2007228070 | 9/2007 |
| JP | 2007274131 | 10/2007 |
| JP | 2007274463 | 10/2007 |
| JP | 2007288679 | 11/2007 |
| JP | 2008005347 | 1/2008 |
| JP | 2008042754 | 2/2008 |
| JP | 2008154056 | 7/2008 |
| JP | 2008259022 | 10/2008 |
| JP | 2008263336 | 10/2008 |
| JP | 2008312002 | 12/2008 |
| JP | 2009206671 | 9/2009 |
| JP | 2010028653 | 2/2010 |
| JP | 2010114554 | 5/2010 |
| JP | 2010268129 | 11/2010 |
| JP | 2011015018 | 1/2011 |
| JP | 4779748 | 9/2011 |
| JP | 2012165189 | 8/2012 |
| JP | 5028944 | 9/2012 |
| JP | 5139111 | 2/2013 |
| JP | 5306565 | 10/2013 |
| JP | 5685173 | 3/2015 |
| JP | 2016051038 | 4/2016 |
| KR | 100298300 | 5/2001 |
| KR | 100901464 | 6/2009 |
| KR | 100960781 | 6/2010 |
| KR | 1020130033723 | 4/2013 |
| KR | 300856915 | 5/2016 |
| TW | 201331932 | 8/2013 |
| TW | I484478 | 5/2015 |
| WO | 1997008896 | 3/1997 |
| WO | 1998047291 | 10/1998 |
| WO | 2000030402 | 5/2000 |
| WO | 2003073786 | 9/2003 |
| WO | 2003088429 | 10/2003 |
| WO | 2004027754 | 4/2004 |
| WO | 2004090865 | 10/2004 |
| WO | 2006049260 | 5/2006 |
| WO | 2006071119 | 7/2006 |
| WO | 2006114015 | 11/2006 |
| WO | 2006121896 | 11/2006 |
| WO | 2007045971 | 4/2007 |
| WO | 2008074249 | 6/2008 |
| WO | 2008125523 | 10/2008 |
| WO | 2009039783 | 4/2009 |
| WO | 2009109069 | 9/2009 |
| WO | 2010001508 | 1/2010 |
| WO | 2010091999 | 8/2010 |
| WO | 2010140084 | 12/2010 |
| WO | 2010144148 | 12/2010 |
| WO | 2011104501 | 9/2011 |
| WO | 2012122132 | 9/2012 |
| WO | 2012140435 | 10/2012 |
| WO | 2012160459 | 11/2012 |
| WO | 2012174159 | 12/2012 |
| WO | 2013016986 | 2/2013 |
| WO | 2013182118 | 12/2013 |
| WO | 2014156292 | 10/2014 |
| WO | 2016176429 | 11/2016 |
| WO | 2016179211 | 11/2016 |
| WO | 2017208022 | 12/2017 |
| WO | 2018140444 | 8/2018 |
| WO | 2018140618 | 8/2018 |
| WO | 2018211806 | 11/2018 |
| WO | 2019231630 | 12/2019 |
| WO | 2020168873 | 8/2020 |
| WO | 2020191354 | 9/2020 |
| WO | 211843001 | 11/2020 |

OTHER PUBLICATIONS

Johansson, et al., Speaker Localisation using the Far-Field SRP-PHAT in Conference Telephony, 2002 International Symposium on Intelligent Signal Processing and Communication Systems, 5 pgs.
Johnson, et al., "Array Signal Processing: Concepts and Techniques," p. 59, Prentice Hall, 1993, 3 pp.
Julstrom et al., Direction-Sensitive Gating: A New Approach to Automatic Mixing, J. Audio Eng. Soc., vol. 32, No. 7/8, Jul./Aug. 1984, pp. 490-506.
Kahrs, Ed., The Past, Present, and Future of Audio Signal Processing, IEEE Signal Processing Magazine, Sep. 1997, pp. 30-57.
Kallinger et al., Multi-Microphone Residual Echo Estimation, 2003 IEEE International Conference on Acoustics, Speech, and Signal Processing, Apr. 2003, 4 pgs.
Kammeyer, et al., New Aspects of Combining Echo Cancellers with Beamformers, IEEE International Conference on Acoustics, Speech, and Signal Processing, Mar. 2005, pp. III-137-III-140.
Kellermann, A Self-Steering Digital Microphone Array, 1991 International Conference on Acoustics, Speech, and Signal Processing, Apr. 1991, pp. 3581-3584.
Kellermann, Acoustic Echo Cancellation for Beamforming Microphone Arrays, in Brandstein, ed., Microphone Arrays: Techniques and Applications, 2001, Springer-Verlag Berlin Heidelberg, pp. 281-306.
Kellermann, Integrating Acoustic Echo Cancellation with Adaptive Beamforming Microphone Arrays, Forum Acusticum, Berlin, Mar. 1999, pp. 1-4.
Kellermann, Strategies for Combining Acoustic Echo Cancellation and Adaptive Beamforming Microphone Arrays, 1997 IEEE International Conference on Acoustics, Speech, and Signal Processing, Apr. 1997, 4 pgs.
Klegon, "Achieve Invisible Audio with the MXA910 Ceiling Array Microphone," Jun. 27, 2016, 10 pp.
Knapp, et al., The Generalized Correlation Method for Estimation of Time Delay, IEEE Transactions on Acoustics, Speech, and Signal Processing, vol. ASSP-24, No. 4, Aug. 1976, pp. 320-327.
Kobayashi et al., A Hands-Free Unit with Noise Reduction by Using Adaptive Beamformer, IEEE Transactions on Consumer Electronics, vol. 54, No. 1, Feb. 2008, pp. 116-122.
Kobayashi et al., A Microphone Array System with Echo Canceller, Electronics and Communications in Japan, Part 3, vol. 89, No. 10, Feb. 2, 2006, pp. 23-32.
Kolundija, et al., "Baffled circular loudspeaker array with broadband high directivity," 2010 IEEE International Conference on Acoustics, Speech and Signal Processing, Dallas, TX, 2010, pp. 73-76.
Lai, et al., "Design of Robust Steerable Broadband Beamformers with Spiral Arrays and the Farrow Filter Structure," Proc. Intl. Workshop Acoustic Echo Noise Control, 2010, 4 pp.
Lebret, et al., Antenna Array Pattern Synthesis via Convex Cptimization, IEEE Trans. on Signal Processing, vol. 45, No. 3, Mar. 1997, pp. 526-532.
LecNet2 Sound System Design Guide, Lectrosonics, Jun. 2, 2006. 28 pages.
Lectrosonics, LecNet2 Sound System Design Guide, Jun. 2006, 28 pgs.
Lee et al., Multichannel Teleconferencing System with Multispatial Region Acoustic Echo Cancellation, International Workshop on Acoustic Echo and Noise Control (IWAENC2003), Sep. 2003, pp. 51-54.
Li, "Broadband Beamforming and Direction Finding Using Concentric Ring Array," Ph.D. Dissertation, University of Missouri-Columbia, Jul. 2005, 163 pp.

(56) References Cited

OTHER PUBLICATIONS

Lindstrom et al., An Improvement of the Two-Path Algorithm Transfer Logic for Acoustic Echo Cancellation, IEEE Transactions on Audio, Speech, and Language Processing, vol. 15, No. 4, May 2007, pp. 1320-1326.
Liu et al., Adaptive Beamforming with Sidelobe Control: A Second-Order Cone Programming Approach, IEEE Signal Proc. Letters, vol. 10, No. 11, Nov. 2003, pp. 331-334.
Liu, et al., "Frequency Invariant Beamforming in Subbands," IEEE Conference on Signals, Systems and Computers, 2004, 5 pp.
Liu, et al., "Wideband Beamforming," Wiley Series on Wireless Communications and Mobile Computing, pp. 143-198, 2010, 297 pp.
Lobo, et al., Applications of Second-Order Cone Programming, Linear Algebra and its Applications 284, 1998, pp. 193-228.
Luo et al., Wideband Beamforming with Broad Nulls of Nested Array, Third Int'l Conf. on Info. Science and Tech., Mar. 23-25, 2013, pp. 1645-1648.
Marquardt et al., A Natural Acoustic Front-End for Interactive TV in the EU-Project Dicit, IEEE Pacific Rim Conference on Communications, Computers and Signal Processing, Aug. 2009, pp. 894-899.
Martin, Small Microphone Arrays with Postfilters for Noise and Acoustic Echo Reduction, in Brandstein, ed., Microphone Arrays: Techniques and Applications, 2001, Springer-Verlag Berlin Heidelberg, pp. 255-279.
Maruo et al., On the Optimal Solutions of Beamformer Assisted Acoustic Echo Cancellers, IEEE Statistical Signal Processing Workshop, 2011, pp. 641-644.
Matheja, et al., "Dynamic Signal Combining for Distributed Microphone Systems in Car Environments," 2011 IEEE International Conference on Acoustics, Speech and Signal Processing, May 22, 2011, 6 pp.
McCowan, Microphone Arrays: A Tutorial, Apr. 2001, 36 pgs.
MFLCRFG Datasheet, Metal_Fab Inc., Sep. 7, 2007, 1 p.
Microphone Array Primer, Shure Question and Answer Page, <https://service.shure.com/s/article/microphone-array-primer?language=en_US>, Jan. 2019, 5 pp.
Milanovic, et al., "Design and Realization of FPGA Platform for Real Time Acoustic Signal Acquisition and Data Processing" 22nd Telecommunications Forum TELFOR, 2014, 6 pp.
Mohammed, A New Adaptive Beamformer for Optimal Acoustic Echo and Noise Cancellation with Less Computational Load, Canadian Conference on Electrical and Computer Engineering, May 2008, pp. 000123-000128.
Mohammed, A New Robust Adaptive Beamformer for Enhancing Speech Corrupted with Colored Noise, AICCSA, Apr. 2008, pp. 508-515.
Mohammed, Real-time Implementation of an efficient RLS Algorithm based on IIR Filter for Acoustic Echo Cancellation, AICCSA, Apr. 2008, pp. 489-494.
Mohan, et al., "Localization of multiple acoustic sources with small arrays using a coherence test," Journal Acoustic Soc Am., 123(4), Apr. 2008, 12 pp.
Moulines, et al., "Pitch-Synchronous Waveform Processing Techniques for Text-to-Speech Synthesis Using Diphones," Speech Communication 9, 1990, 15 pp.
Multichannel Acoustic Echo Cancellation, Obtained from website http://www.buchner-net.com/mcaec.html, Jun. 2011. 3 pages.
Myllyla et al., Adaptive Beamforming Methods for Dynamically Steered Microphone Array Systems, 2008 IEEE International Conference on Acoustics, Speech and Signal Processing, Mar.-Apr. 2008, pp. 305-308.
New Shure Microflex Advance MXA910 Microphone With Intellimix Audio Processing Provides Greater Simplicity, Flexibility, Clarity, Press Release, Jun. 12, 2019, 4 pp.
Nguyen-Ky, et al., "An Improved Error Estimation Algorithm for Stereophonic Acoustic Echo Cancellation Systems," 1st International Conference on Signal Processing and Communication Systems, Dec. 17-19, 2007, 5 pp.
Office Action for Taiwan Patent Application No. 105109900 dated May 5, 2017. 10 pages.
Office Action issued for Japanese Patent Application No. 2015-023781 dated Jun. 20, 2016, 4 pp.
Oh, et al., "Hands-Free Voice Communication in an Automobile With a Microphone Array," 1992 IEEE International Conference on Acoustics, Speech, and Signal Processing, Mar. 1992, pp. 1-281-1-284.
Olszewski, et al., "Steerable Highly Directional Audio Beam Loudspeaker," Interspeech 2005, 4 pp.
Omologo, Multi-Microphone Signal Processing for Distant-Speech Interaction, Human Activity and Vision Summer School (HAVSS), INRIA Sophia Antipolis, Oct. 3, 2012, 79 pgs.
Soundweb London Application Guides, BSS Audio, 2010. 120 pgs.
Symetrix, Inc., SymNet Network Audio Solutions Brochure, 2008, 32 pgs.
Tan, et al., "Pitch Detection Algorithm: Autocorrelation Method and AMDF," Department of Computer Engineering, Prince of Songkhla University, Jan. 2003, 6 pp.
Tandon, et al., "An Efficient, Low-Complexity, Normalized LMS Algorithm for Echo Cancellation," 2nd Annual IEEE Northeast Workshop on Circuits and Systems, Jun. 2004, pp. 161-164.
Tetelbaum et al., Design and Implementation of a Conference Phone Based on Microphone Array Technology, Proc. Global Signal Processing Conference and Expo (GSPx), Sep. 2004, 6 pgs.
Tiete et al., SoundCompass: A Distributed MEMS Microphone Array-Based Sensor for Sound Source Localization, SENSORS, Jan. 23, 2014, pp. 1918-1949.
TOA Corp., Ceiling Mount Microphone AN-9001 Operating Instructions, http://www.toaelectronics.com/media/an9001_mt1e.pdf, 1 pg.
Togami, et al., "Subband Beamformer Combined with Time-Frequency ICA for Extraction of Target Source Under Reverberant Environments," 17th European Signal Processing Conference, Aug. 2009, 5 pp.
U.S. Appl. No. 16/598,918, filed Oct. 10, 2019, 50 pp.
Van Compernolle, Switching Adaptive Filters for Enhancing Noisy and Reverberant Speech from Microphone Array Recordings, Proc. IEEE Int. Conf. on Acoustics, Speech, and Signal Processing, Apr. 1990, pp. 833-836.
Van Trees, Optimum Array Processing: Part IV of Detection, Estimation, and Modulation Theory, 2002, 54 pgs., pp. i-xxv, 90-95, 201-230.
Van Veen et al., Beamforming: A Versatile Approach to Spatial Filtering, IEEE ASSP Magazine, vol. 5, issue 2, Apr. 1988, pp. 4-24.
Vicente, "Adaptive Array Signal Processing Using the Concentric Ring Array and the Spherical Array," Ph.D. Dissertation, University of Missouri, May 2009, 226 pp.
Wang et al., Combining Superdirective Beamforming and Frequency-Domain Blind Source Separation for Highly Reverberant Signals, EURASIP Journal on Audio, Speech, and Music Processing, vol. 2010, pp. 1-13.
Warsitz, et al., "Blind Acoustic Beamforming Based on Generalized Eigenvalue Decomposition," IEEE Transactions on Audio, Speech and Language Processing, vol. 15, No. 5, 2007, 11 pp.
Weinstein, et al., "LOUD: A 1020-Node Microphone Array and Acoustic Beamformer," 14th International Congress on Sound & Vibration, Jul. 2007, 8 pgs.
Weinstein, et al., "LOUD: A 1020-Node Modular Microphone Array and Beamformer for Intelligent Computing Spaces," MIT Computer Science and Artifical Intelligence Laboratory, 2004, 18 pp.
Wung, "A System Approach to Multi-Channel Acoustic Echo Cancellation and Residual Echo Suppression for Robust Hands-Free Teleconferencing," Georgia Institute of Technology, May 2015, 167 pp.
XAP Audio Conferencing Brochure, ClearOne Communications, Inc., 2002. 78 pages.
Yamaha Corp., MRX7-D Signal Processor Product Specifications, 2016, 12 pgs.
Yamaha Corp., PJP-100H IP Audio Conference System Owner's Manual, Sep. 2006, 59 pgs.
Yamaha Corp., PJP-EC200 Conference Echo Canceller Brochure, Oct. 2009, 2 pgs.

(56) References Cited

OTHER PUBLICATIONS

Yan et al., Convex Optimization Based Time-Domain Broadband Beamforming with Sidelobe Control, Journal of the Acoustical Society of America, vol. 121, No. 1, Jan. 2007, pp. 46-49.
Yensen et al., Synthetic Stereo Acoustic Echo Cancellation Structure with Microphone Array Beamforming for VOIP Conferences, 2000 IEEE International Conference on Acoustics, Speech, and Signal Processing, Jun. 2000, pp. 817-820.
Yermeche, et al., "Real-Time DSP Implementation of a Subband Beamforming Algorithm for Dual Microphone Speech Enhancement," 2007 IEEE International Symposium on Circuits and Systems, 4 pp.
Zavarehei, et al., "Interpolation of Lost Speech Segments Using LP-HNM Model with Codebook Post-Processing," IEEE Transactions on Multimedia, vol. 10, No. 3, Apr. 2008, 10 pp.
Zhang, et al., "F-T-LSTM based Complex Network for Joint Acoustic Echo Cancellation and Speech Enhancement," Audio, Speech and Language Processing Group, Jun. 2021, 5 pp.
Zhang, et al., "Multichannel Acoustic Echo Cancelation in Multiparty Spatial Audio Conferencing with Constrained Kalman Filtering," 11th International Workshop on Acoustic Echo and Noise Control, Sep. 14, 2008, 4 pp.
Zhang, et al., "Selective Frequency Invariant Uniform Circular Broadband Beamformer," EURASIP Journal on Advances in Signal Processing, vol. 2010, pp. 1-11.
Zheng, et al., "Experimental Evaluation of a Nested Microphone Array With Adaptive Noise Cancellers," IEEE Transactions on Instrumentation and Measurement, vol. 53, No. 3, Jun. 2004, 10 pp.
Order, Conduct of the Proceeding, *Clearone, Inc.* v. *Shure Acquisition Holdings, Inc.*, Nov. 2, 2020, 10 pp.
Pados et al., An Iterative Algorithm for the Computation of the MVDR Filter, IEEE Trans. on Signal Processing, vol. 49, No. 2, Feb. 2001, pp. 290-300.
Palladino, "This App Lets You Control Your Smarthome Lights via Augmented Reality," Next Reality Mobile AR News, Jul. 2, 2018, 5 pp.
Parikh, et al., "Methods for Mitigating IP Network Packet Loss in Real Time Audio Streaming Applications," GatesAir, 2014, 6 pp.
Pasha, et al., "Clustered Multi-channel Dereverberation for Ad-hoc Microphone Arrays," Proceedings of APSIPA Annual Summit and Conference, Dec. 2015, pp. 274-278.
Petitioner's Motion for Sanctions, *Clearone, Inc.* v. *Shure Acquisition Holdings, Inc.*, Aug. 24, 2020, 20 pp.
Pettersen, "Broadcast Applications for Voice-Activated Microphones," db, Jul./Aug. 1985, 6 pgs.
Pfeifenberger, et al., "Nonlinear Residual Echo Suppression using a Recurrent Neural Network," Interspeech 2020, 5 pp.
Phoenix Audio Technologies, "Beamforming and Microphone Arrays—Common Myths", Apr. 2016, http://info.phnxaudio.com/blog/microphone-arrays-beamforming-myths-1, 19 pp.
Plascore, PCGA-XR1 3003 Aluminum Honeycomb Data Sheet, 2008, 2 pgs.
Polycom Inc., Vortex EF2211/EF2210 Reference Manual, 2003, 66 pgs.
Polycom, Inc., Polycom SoundStructure C16, C12, C8, and SR12 Design Guide, Nov. 2013, 743 pgs.
Polycom, Inc., Setting Up the Polycom HDX Ceiling Microphone Array Series, https://support.polycom.com/content/dam/polycom-support/products/Telepresence-and-Video/HDX%20Series/setup-maintenance/en/hdx_ceiling_microphone_array_setting_up.pdf, 2010, 16 pgs.
Polycom, Inc., Vortex EF2241 Reference Manual, 2002, 68 pgs.
Polycom, Inc., Vortex EF2280 Reference Manual, 2001, 60 pp.
Pomona, Model 3306, Datasheet, Jun. 9, 1999, 1 p.
Powers, et al., "Proving Adaptive Directional Technology Works: A Review of Studies," The Hearing Review, Apr. 6, 2004, 5 pp.
Prime, et al., "Beamforming Array Optimisation Averaged Sound Source Mapping on a Model Wind Turbine," ResearchGate, Nov. 2014, 10 pp.
Rabinkin et al., Estimation of Wavefront Arrival Delay Using the Cross-Power Spectrum Phase Technique, 132nd Meeting of the Acoustical Society of America, Dec. 1996, pp. 1-10.
Rane Corp., Halogen Acoustic Echo Cancellation Guide, AEC Guide Version 2, Nov. 2013, 16 pgs.
Rao, et al., "Fast LMS/Newton Algorithms for Stereophonic Acoustic Echo Cancelation," IEEE Transactions on Signal Processing, vol. 57, No. 8, Aug. 2009. 12 pages.
Reuven et al., Joint Acoustic Echo Cancellation and Transfer Function GSC in the Frequency Domain, 23rd IEEE Convention of Electrical and Electronics Engineers in Israel, Sep. 2004, pp. 412-415.
Reuven et al., Joint Noise Reduction and Acoustic Echo Cancellation Using the Transfer-Function Generalized Sidelobe Canceller, Speech Communication, vol. 49, 2007, pp. 623-635.
Reuven, et al., "Multichannel Acoustic Echo Cancellation and Noise Reduction in Reverberant Environments Using the Transfer-Function GSC," 2007 IEEE International Conference on Acoustics, Speech and Signal Processing, Apr. 2007, 4 pp.
Ristimaki, Distributed Microphone Array System for Two-Way Audio Communication, Helsinki Univ. of Technology, Master's Thesis, Jun. 15, 2009, 73 pgs.
Rombouts et al., An Integrated Approach to Acoustic Noise and Echo Cancellation, Signal Processing 85, 2005, pp. 849-871.
Sällberg, "Faster Subband Signal Processing," IEEE Signal Processing Magazine, vol. 30, No. 5, Sep. 2013, 6 pp.
Sasaki et al., A Predefined Command Recognition System Using a Ceiling Microphone Array in Noisy Housing Environments, 2008 IEEE/RSJ International Conference on Intelligent Robots and Systems, Sep. 2008, pp. 2178-2184.
Sennheiser, New microphone solutions for ceiling and desk installation, https://en-us.sennheiser.com/news-new-microphone-solutions-for-ceiling-and-desk-installation, Feb. 2011, 2 pgs.
Sennheiser, TeamConnect Ceiling, https://en-us.sennheiser.com/conference-meeting-rooms-teamconnect-ceiling, 2017, 7 pgs.
SerDes, Wikipedia article, last edited on Jun. 25, 2018; retrieved on Jun. 27, 2018, 3 pp., https://en.wikipedia.org/wiki/SerDes.
Sessler, et al., "Directional Transducers," IEEE Transactions on Audio and Electroacoustics, vol. AU-19, No. 1, Mar. 1971, pp. 19-23.
Sessler, et al., "Toroidal Microphones," Journal of Acoustical Society of America, vol. 46, No. 1, 1969, 10 pp.
Shure AMS Update, vol. 1, No. 1, 1983, 2 pgs.
Shure AMS Update, vol. 4, No. 4, 1997, 8 pgs.
Shure Debuts Microflex Advance Ceiling and Table Array Microphones, Press Release, Feb. 9, 2016, 4 pp.
Shure Inc., A910-HCM Hard Ceiling Mount, retrieved from website <http://www.shure.com/en-US/products/accessories/a910hcm> on Jan. 16, 2020, 3 pp.
Shure Inc., Microflex Advance, http://www.shure.com/americas/microflex-advance, 12 pgs.
Shure Inc., MX395 Low Profile Boundary Microphones, 2007, 2 pgs.
Shure Inc., MXA910 Ceiling Array Microphone, http://www.shure.com/americas/products/microphones/microflex-advance/mxa910-ceiling-array-microphone, 7 pgs. 2009-2017.
Shure, MXA910 With IntelliMix, Ceiling Array Microphone, available at <https://www.shure.com/en-US/products/microphones/mxa910>, as early as 2020, 12 pp.
Shure, New MXA910 Variant Now Available, Press Release, Dec. 13, 2019, 5 pp.
Shure, Q&A in Response to Recent US Court Ruling on Shure MXA910, Available at <https://www.shure.com/en-US/meta/legal/q-and-a-inresponse-to-recent-US-court-ruling-on-shure-mxa910-response>, As early as 2020, 5 pp.
Shure, RK244G Replacement Screen and Grille, Datasheet, 2013, 1 p.
Shure, The Microflex Advance MXA310 Table Array Microphone, Available at <https://www.shure.com/en-US/products/microphones/mxa310>, As early as 2020, 12 pp.
Signal Processor MRX7-D Product Specifications, Yamaha Corporation, 2016. 12 pages.

(56) References Cited

OTHER PUBLICATIONS

Silverman et al., Performance of Real-Time Source-Location Estimators for a Large-Aperture Microphone Array, IEEE Transactions on Speech and Audio Processing, vol. 13, No. 4, Jul. 2005, pp. 593-606.
Sinha, Ch. 9: Noise and Echo Cancellation, in Speech Processing in Embedded Systems, Springer, 2010, pp. 127-142.
SM 69 Stereo Microphone, Datasheet, Georg Neumann GmbH, Available at <https://ende.neumann.com/product_files/6552/download>, 1 p.
Soda et al., Introducing Multiple Microphone Arrays for Enhancing Smart Home Voice Control, The Institute of Electronics, Information and Communication Engineers, Technical Report of IEICE, Jan. 2013, 6 pgs.
"Philips Hue Bulbs and Wireless Connected Lighting System," Web page https://www.philips-hue.com/en-in, 8 pp, Sep. 23, 2020, retrieved from Internet Archive Wayback Machine, <https://web.archive.org/web/20200923171037/https://www.philips-hue.com/en-in> on Sep. 27, 2021. 8 pages.
"VSA 2050 II Digitally Steerable Column Speaker," Web page https://www.rcf.it/en_US/products/product-detail/vsa-2050-ii/972389, 15 pages, Dec. 24, 2018.
Advanced Network Devices, IPSCM Ceiling Tile IP Speaker, Feb. 2011, 2 pgs.
Advanced Network Devices, IPSCM Standard 2' by 2' Ceiling Tile Speaker, 2 pgs.
Affes, et al., "A Signal Subspace Tracking Algorithm for Microphone Array Processing of Speech," IEEE Trans. on Speech and Audio Processing, vol. 5, No. 5, Sep. 1997, pp. 425-437.
Affes, et al., "A Source Subspace Tracking Array of Microphones for Double Talk Situations," 1996 IEEE International Conference on Acoustics, Speech, and Signal Processing Conference Proceedings, May 1996, pp. 909-912.
Affes, et al., "An Algorithm for Multisource Beamforming and Multitarget Tracking," IEEE Trans. on Signal Processing, vol. 44, No. 6, Jun. 1996, pp. 1512-1522.
Affes, et al., "Robust Adaptive Beamforming via LMS-Like Target Tracking," Proceedings of IEEE International Conference on Acoustics, Speech and Signal Processing, Apr. 1994, pp. IV-269-IV-272.
Ahonen, et al., "Directional Analysis of Sound Field with Linear Microphone Array and Applications in Sound Reproduction," Audio Engineering Socity, Convention Paper 7329, May 2008, 11 pp.
Alarifi, et al., "Ultra Wideband Indoor Positioning Technologies: Analysis and Recent Advances," Sensors 2016, vol. 16, No. 707, 36 pp.
Amazon webpage for Metalfab MFLCRFG (last visited Apr. 22, 2020) available at <https://www.amazon.com/RETURN-FILTERGRILLE-Drop-Ceiling/dp/B0064Q9A7I/ref=sr 12?dchild=1&keywords=drop+ceiling+return+air+grille&qid=1585862723&s=hi&sr=1-2>, 11 pp.
Armstrong "Walls" Catalog available at <https://www.armstrongceilings.com/content/dam/armstrongceilings/commercial/north-america/catalogs/armstrong-ceilings-wallsspecifiers-reference.pdf>, 2019, 30 pp.
Armstrong Tectum Ceiling & Wall Panels Catalog available at <https://www.armstrongceilings.com/content/dam/armstrongceilings/commercial/north-america/brochures/tectum-brochure.pdf>, 2019, 16 pp.
Armstrong Woodworks Concealed Catalog available at <https://sweets.construction.com/swts_content_files/3824/442581.pdf>, 2014, 6 pp.
Armstrong Woodworks Walls Catalog available at <https://www.armstrongceilings.com/pdbupimagesclg/220600.pdf/download/data-sheet-woodworks-walls.pdf>, 2019, 2 pp.
Armstrong World Industries, Inc., I-Ceilings Sound Systems Speaker Panels, 2002, 4 pgs.
Armstrong, Acoustical Design: Exposed Structure, available at <https://www.armstrongceilings.com/pdbupimagesclg/217142.pdf/download/acoustical-design-exposed-structurespaces-brochure.pdf>, 2018, 19 pp.
Armstrong, Ceiling Systems, Brochure page for Armstrong Softlook, 1995, 2 pp.
Armstrong, Excerpts from Armstrong 2011-2012 Ceiling Wall Systems Catalog, available at <https://web.archive.org/web/20121116034120/http://www.armstrong.com/commceilingsna/en_us/pdf/ceilings_catalog_screen-2011.pdf>, as early as 2012, 162 pp.
Armstrong, i-Ceilings, Brochure, 2009, 12 pp.
Arnold, et al., "A Directional Acoustic Array Using Silicon Micromachined Piezoresistive Microphones," Journal of the Acoustical Society of America, 113(1), Jan. 2003, 10 pp.
Atlas Sound, I128SYSM IP Compliant Loudspeaker System with Microphone Data Sheet, 2009, 2 pgs.
Atlas Sound, 1'X2' IP Speaker with Micophone for Suspended Ceiling Systems, https://www.atlasied.com/i128sysm, retrieved Oct. 25, 2017, 5 pgs.
Audio Technica, ES945 Omnidirectional Condenser Boundary Microphones, https://eu.audio-technica.com/resources/ES945%20Specifications.pdf, 2007, 1 pg.
Audix Microphones, Audix Introduces Innovative Ceiling Mics, http://audixusa.com/docs_12/latest_news/EFplFkAAklOtSdolke.shtml, Jun. 2011, 6 pgs.
Audix Microphones, M70 Flush Mount Ceiling Mic, May 2016, 2 pgs.
Automixer Gated, Information Sheet, MIT, Nov. 2019, 9 pp.
Avnetwork, "Top Five Conference Room Mic Myths," Feb. 25, 2015, 14 pp.
Beh, et al., "Combining Acoustic Echo Cancellation and Adaptive Beamforming for Achieving Robust Speech Interface in Mobile Robot," 2008 IEEE/RSJ International Conference on Intelligent Robots and Systems, Sep. 2008, pp. 1693-1698.
Benesty, et al., "A New Class of Doubletalk Detectors Based on Cross-Correlation," IEEE Transactions on Speech and Audio Processing, vol. 8, No. 2, Mar. 2000, pp. 168-172.
Benesty, et al., "Adaptive Algorithms for Mimo Acoustic Echo Cancellation," AI2 Allen Institute for Artifical Intelligence, 2003.
Benesty, et al., "Differential Beamforming," Fundamentals of Signal Enhancement and Array Signal Processing, First Edition, 2017, 39 pp.
Benesty, et al., "Frequency-Domain Adaptive Filtering Revisited, Generalization to the Multi-Channel Case, and Application to Acoustic Echo Cancellation," 2000 IEEE International Conference on Acoustics, Speech, and Signal Processing Proceedings, Jun. 2000, pp. 789-792.
Benesty, et al., "Microphone Array Signal Processing," Springer, 2010, 20 pp.
Berkun, et al., "Combined Beamformers for Robust Broadband Regularized Superdirective Beamforming," IEEE/ACM Transactions on Audio, Speech, and Language Processing, vol. 23, No. 5, May 2015, 10 pp.
Beyer Dynamic, Classis BM 32-33-34 DE-EN-FR 2016, 1 pg.
Beyer Dynamic, Classis-BM- 33-PZ A1, 2013, 1 pg.
BNO055, Intelligent 9-axis absolute orientation sensor, Data sheet, Bosch, Nov. 2020, 118 pp.
Boyd, et al., Convex Optimization, Mar. 15, 1999, 216 pgs.
Brandstein, et al., "Microphone Arrays: Signal Processing Techniques and Applications," Digital Signal Processing, Springer-Verlag Berlin Heidelberg, 2001, 401 pgs.
Brooks, et al., "A Quantitative Assessment of Group Delay Methods for Identifying Glottal Closures in Voiced Speech," IEEE Transaction on Audio, Speech, and Language Processing, vol. 14, No. 2, Mar. 2006, 11 pp.
Bruel & Kjaer, by J.J. Christensen and J. Hald, Technical Review: Beamforming, No. 1, 2004, 54 pgs.
BSS Audio, Soundweb London Application Guides, 2010, 120 pgs.
Buchner, et al., "An Acoustic Human-Machine Interface with Multi-Channel Sound Reproduction," IEEE Fourth Workshop on Multimedia Signal Processing, Oct. 2001, pp. 359-364.
Buchner, et al., "An Efficient Combination of Multi-Channel Acoustic Echo Cancellation with a Beamforming Microphone Array," International Workshop on Hands-Free Speech Communication (HSC2001), Apr. 2001, pp. 55-58.

(56) References Cited

OTHER PUBLICATIONS

Buchner, et al., "Full-Duplex Communication Systems Using Loudspeaker Arrays and Microphone Arrays," IEEE International Conference on Multimedia and Expo, Aug. 2002, pp. 509-512.
Buchner, et al., "Generalized Multichannel Frequency-Domain Adaptive Filtering: Efficient Realization and Application to Hands-Free Speech Communication," Signal Processing 85, 2005, pp. 549-570.
Buchner, et al., "Multichannel Frequency-Domain Adaptive Filtering with Application to Multichannel Acoustic Echo Cancellation," Adaptive Signal Processing, 2003, pp. 95-128.
Buck, "Aspects of First-Order Differential Microphone Arrays in the Presence of Sensor Imperfections," Transactions on Emerging Telecommunications Technologies, 13.2, 2002, 8 pp.
Buck, et al., "First Order Differential Microphone Arrays for Automotive Applications," 7th International Workshop on Acoustic Echo and Noise Control, Darmstadt University of Technology, Sep. 10-13, 2001, 4 pp.
International Search Report and Written Opinion for PCT/US2023/060243 dated Apr. 6, 2023, 13 pp.
Double Condenser Microphone SM 69, Datasheet, Georg Neumann GmbH, available at <https://ende.neumann.com/product_files/7453/download>, 8 pp.
Eargle, "The Microphone Handbook," Elar Publ. Co., 1st ed., 1981, 4 pp.
Enright, Notes From Logan, June edition of Scanlines, Jun. 2009, 9 pp.
Fan, et al., "Localization Estimation of Sound Source by Microphones Array," Procedia Engineering 7, 2010, pp. 312-317.
Firoozabadi, et al., "Combination of Nested Microphone Array and Subband Processing for Multiple Simultaneous Speaker Localization," 6th International Symposium on Telecommunications, Nov. 2012, pp. 907-912.
Flanagan et al., Autodirective Microphone Systems, Acustica, vol. 73, 1991, pp. 58-71.
Flanagan, et al., "Computer-Steered Microphone Arrays for Sound Transduction in Large Rooms," J. Acoust. Soc. Am. 78 (5), Nov. 1985, pp. 1508-1518.
Fohhn Audio New Generation of Beam Steering Systems Available Now, audioXpress Staff, May 10, 2017, 8 pp.
Fox, et al., "A Subband Hybrid Beamforming for In-Car Speech Enhancement," 20th European Signal rocessing Conference, Aug. 2012, 5 pp.
Frost, III, An Algorithm for Linearly Constrained Adaptive Array Processing, Proc. IEEE, vol. 60, No. 8, Aug. 1972, pp. 926-935.
Gannot et al., Signal Enhancement using Beamforming and Nonstationarity with Applications to Speech, IEEE Trans. on Signal Processing, vol. 49, No. 8, Aug. 2001, pp. 1614-1626.
Gansler et al., A Double-Talk Detector Based on Coherence, IEEE Transactions on Communications, vol. 44, No. 11, Nov. 1996, pp. 1421-1427.
Gazor et al., Robust Adaptive Beamforming via Target Tracking, IEEE Transactions on Signal Processing, vol. 44, No. 6, Jun. 1996, pp. 1589-1593.
Gazor et al., Wideband Multi-Source Beamforming with Adaptive Array Location Calibration and Direction Finding, 1995 International Conference on Acoustics, Speech, and Signal Processing, May 1995, pp. 1904-1907.
Gentner Communications Corp., AP400 Audio Perfect 400 Audioconferencing System Installation & Operation Manual, Nov. 1998, 80 pgs.
Gentner Communications Corp., XAP 800 Audio Conferencing System Installation & Operation Manual, Oct. 2001, 152 pgs.
Gil-Cacho et al., Multi-Microphone Acoustic Echo Cancellation Using Multi-Channel Warped Linear Prediction of Common Acoustical Poles, 18th European Signal Processing Conference, Aug. 2010, pp. 2121-2125.
Giuliani, et al., "Use of Different Microphone Array Configurations for Hands-Free Speech Recognition in Noisy and Reverberant Environment," IRST-Istituto per la Ricerca Scientifica e Tecnologica, Sep. 22, 1997, 4 pp.
Gritton et al., Echo Cancellation Algorithms, IEEE ASSP Magazine, vol. 1, issue 2, Apr. 1984, pp. 30-38.
Hald, et al., "A class of optimal broadband phased array geometries designed for easy construction," 2002 Int'l Congress & Expo. on Noise Control Engineering, Aug. 2002, 6 pp.
Hamalainen, et al., "Acoustic Echo Cancellation for Dynamically Steered Microphone Array Systems," 2007 IEEE Workshop on Applications of Signal Processing to Audio and Acoustics, Oct. 2007, pp. 58-61.
Hayo, Virtual Controls for Real Life, Web page downloaded from https://hayo.io/ on Sep. 18, 2019, 19 pp.
Herbordt et al., A Real-time Acoustic Human-Machine Front-End for Multimedia Applications Integrating Robust Adaptive Beamforming and Stereophonic Acoustic Echo Cancellation, 7th International Conference on Spoken Language Processing, Sep. 2002, 4 pgs.
Herbordt et al., GSAEC—Acoustic Echo Cancellation embedded into the Generalized Sidelobe Canceller, 10th European Signal Processing Conference, Sep. 2000, 5 pgs.
Herbordt et al., Multichannel Bin-Wise Robust Frequency-Domain Adaptive Filtering and Its Application to Adaptive Beamforming, IEEE Transactions on Audio, Speech, and Language Processing, vol. 15, No. 4, May 2007, pp. 1340-1351.
Herbordt, "Combination of Robust Adaptive Beamforming with Acoustic Echo Cancellation for Acoustic Human/Machine Interfaces," Friedrich-Alexander University, 2003, 293 pgs.
Herbordt, et al., Joint Optimization of LCMV Beamforming and Acoustic Echo Cancellation for Automatic Speech Recognition, IEEE International Conference on Acoustics, Speech, and Signal Processing, Mar. 2005, pp. III-77-III-80.
Holm, "Optimizing Microphone Arrays for use in Conference Halls," Norwegian University of Science and Technology, Jun. 2009, 101 pp.
Huang et al., Immersive Audio Schemes: The Evolution of Multiparty Teleconferencing, IEEE Signal Processing Magazine, Jan. 2011, pp. 20-32.
ICONYX Gen5, Product Overview, Renkus-Heinz, Dec. 24, 2018, 2 pp.
International Search Report and Written Opinion for PCT/US2016/022773 dated Jun. 10, 2016. 13 pages.
International Search Report and Written Opinion for PCT/US2016/029751 dated Nov. 28, 2016, 21 pp.
International Search Report and Written Opinion for PCT/US2018/013155 dated Jun. 8, 2018. 12 pages.
International Search Report and Written Opinion for PCT/US2018/015269 dated Mar. 26, 2018, 12 pp.
International Search Report and Written Opinion for PCT/US2019/031833 dated Jul. 24, 2019, 16 pp.
International Search Report and Written Opinion for PCT/US2019/033470 dated Jul. 31, 2019, 12 pp.
International Search Report and Written Opinion for PCT/US2019/034692 dated Sep. 10, 2019, 11 pp.
International Search Report and Written Opinion for PCT/US2019/051491 dated Dec. 10, 2019, 13 pp.
International Search Report and Written Opinion for PCT/US2019/051989 dated Jan. 10, 2020, 15 pp.
International Search Report and Written Opinion for PCT/US2020/024063 dated Aug. 31, 2020, 18 pp.
International Search Report and Written Opinion for PCT/US2020/035185 dated Sep. 15, 2020, 11 pp.
International Search Report and Written Opinion for PCT/US2020/058385 dated Mar. 31, 2021, 20 pp.
International Search Report and Written Opinion for PCT/US2021/070625 dated Sep. 17, 2021, 17 pp.
International Search Report and Written Opinion for PCT/US2022/014061 dated May 10, 2022, 14 pp.
International Search Report for PCT/US2020/024005 dated Jun. 12, 2020, 12 pp.
Invensense, "Microphone Array Beamforming," Application Note AN-1140, Dec. 31, 2013, 12 pp.
Invensense, Recommendations for Mounting and Connecting InvenSense MEMS Microphones, Application Note AN-1003, 2013, 11 pp.

(56) References Cited

OTHER PUBLICATIONS

Invitation to Pay Additional Fees for PCT/US2022/045694 dated Jan. 24, 2023, 13 pp.
Ishii et al., Investigation on Sound Localization using Multiple Microphone Arrays, Reflection and Spatial Information, Japanese Society for Artificial Intelligence, JSAI Technical Report, SIG-Challenge-B202-11, 2012, pp. 64-69.
Ito et al., Aerodynamic/Aeroacoustic Testing in Anechoic Closed Test Sections of Low-speed Wind Tunnels, 16th AIAA/CEAS Aeroacoustics Conference, 2010, 11 pgs.
Buck, et al., "Self-Calibrating Microphone Arrays for Speech Signal Acquisition: A Systematic Approach," Signal Processing, vol. 86, 2006, pp. 1230-1238.
Burton, et al., "A New Structure for Combining Echo Cancellation and Beamforming in Changing Acoustical Environments," IEEE International Conference on Acoustics, Speech and Signal Processing, 2007, pp. 1-77-1-80.
BZ-3a Installation Instructions, XEDIT Corporation, Available at <chrome-extension://efaidnbmnnnibpcajpcglclefindmkaj/viewer.html?pdfurl=https%3A%2F%2Fwww.servoreelers.com%2Fmt-content%2Fuploads%2F2017%2F05%2Fbz-a-3universal-2017c.pdf&clen=189067&chunk=true>, 1 p.
Cabral, et al., Glottal Spectral Separation for Speech Synthesis, IEEE Journal of Selected Topics in Signal Processing, 2013, 15 pp.
Campbell, "Adaptive Beamforming Using a Microphone Array for Hands-Free Telephony," Virginia Polytechnic Institute and State University, Feb. 1999, 154 pgs.
Canetto, et al., "Speech Enhancement Systems Based on Microphone Arrays," VI Conference of the Italian Society for Applied and Industrial Mathematics, May 27, 2002, 9 pp.
Cao, "Survey on Acoustic Vector Sensor and its Applications in Signal Processing" Proceedings of the 33rd Chinese Control Conference, Jul. 2014, 17 pp.
Cech, et al., "Active-Speaker Detection and Localization with Microphones and Cameras Embedded into a Robotic Head," IEEE-RAS International Conference on Humanoid Robots, Oct. 2013, pp. 203-210.
Chan, et al., "Uniform Concentric Circular Arrays with Frequency-Invariant Characteristics-Theory, Design, Adaptive Beamforming and DOA Estimation," IEEE Transactions on Signal Processing, vol. 55, No. 1, Jan. 2007, pp. 165-177.
Chau, et al., "A Subband Beamformer on an Ultra Low-Power Miniature DSP Platform," 2002 IEEE International Conference on Acoustics, Speech, and Signal Processing, 4 pp.
Chen, et al., "A General Approach to the Design and Implementation of Linear Differential Microphone Arrays," Signal and Information Processing Association Annual Summit and Conference, 2013 Asia-Pacific, IEEE, 7 pp.
Chen, et al., "Design and Implementation of Small Microphone Arrays," PowerPoint Presentation, Northwestern Polytechnical University and Institut national de la recherche scientifique, Jan. 1, 2014, 56 pp.
Chen, et al., "Design of Robust Broadband Beamformers with Passband Shaping Characteristics using Tikhonov Regularization," IEEE Transactions on Audio, Speech, and Language Processing, vol. 17, No. 4, May 2009, pp. 565-681.
Chou, "Frequency-Independent Beamformer with Low Response Error," 1995 International Conference on Acoustics, Speech, and Signal Processing, pp. 2995-2998, May 9, 1995, 4 pp.
Chu, "Desktop Mic Array for Teleconferencing," 1995 International Conference on Acoustics, Speech, and Signal Processing, May 1995, pp. 2999-3002.
Circuit Specialists webpage for an aluminum enclosure, available at <https://www.circuitspecialists.com/metal-instrument-enclosure-la7.html?otaid=gpl&gclid=EAlalQobChMI2JTw-Ynm6AlVgbblCh3F4QKuEAKYBiABEgJZMPD_BwE>, 3 pp., 2019.
ClearOne Introduces Ceiling Microphone Array With Built-In Dante Interface, Press Release; GlobeNewswire, Jan. 8, 2019, 2 pp.
ClearOne Launches Second Generation of its Groundbreaking Beamforming Microphone Array, Press Release, Acquire Media, Jun. 1, 2016, 2 pp.
ClearOne to Unveil Beamforming Microphone Array with Adaptive Steering and Next Generation Acoustic Echo Cancellation Technology, Press Release, InfoComm, Jun. 4, 2012, 1 p.
ClearOne, Clearly Speaking Blog, "Advanced Beamforming Microphone Array Technology for Corporate Conferencing Systems," Nov. 11, 2013, 5 pp., http://www.clearone.com/blog/advanced-beamforming-microphone-array-lechnology-for-corporate-conferencing-systems/.
ClearOne, Beamforming Microphone Array, Mar. 2012, 6 pgs.
ClearOne, Ceiling Microphone Array Installation Manual, Jan. 9, 2012, 20 pgs.
ClearOne, Converge/Converge Pro, Manual, 2008, 51 pp.
ClearOne, Professional Conferencing Microphones, Brochure, Mar. 2015, 3 pp.
Coleman, "Loudspeaker Array Processing for Personal Sound Zone Reproduction," Centre for Vision, Speech and Signal Processing, 2014, 239 pp.
Cook, et al., An Altemative Approach to Interpolated Array Processing for Uniform Circular Arrays, Asia-Pacific Conference on Circuits and Systems, 2002, pp. 411-414.
Cox, et al., "Robust Adaptive Beamforming," IEEE Trans. Acoust., Speech, and Signal Processing, vol. ASSP-35, No. 10, Oct. 1987, pp. 1365-1376.
CTG Audio, Ceiling Microphone CTG CM-01, Jun. 5, 2008, 2 pgs.
CTG Audio, CM-01 & CM-02 Ceiling Microphones Specifications, 2 pgs.
CTG Audio, CM-01 & CM-02 Ceiling Microphones, 2017, 4 pgs.
CTG Audio, CTG FS-400 and RS-800 with "Beamforming" Technology, Datasheet, As early as 2009, 2 pp.
CTG Audio, CTG User Manual for the FS- 400/800 Beamforming Mixers, Nov. 2008, 26 pp.
CTG Audio, Expand Your IP Teleconferencing to Full Room Audio, Obtained from website htt. )://www ct audio com/exand-, our-i -teleconforencino-to-ful-room-audio-while-conquennc.1-echo-cancelation-issues Mull, 2014. 3 pages.
CTG Audio, Frequently Asked Questions, As early as 2009, 2 pp.
CTG Audio, Installation Manual and User Guidelines for the Soundman SM 02 System, May 2001, 29 pp.
CTG Audio, Installation Manual, Nov. 21, 2008, 25 pgs.
CTG Audio, Introducing the CTG FS-400 and FS-800 with Beamforming Technology, As early as 2008, 2 pp.
CTG Audio, Meeting the Demand for Ceiling Mics in the Enterprise 5 Best Practices, Brochure, 2012, 9 pp.
CTG Audio, White on White—Introducing the CM-02 Ceiling Microphone, https://ctgaudio.com/white-on-white-introducing-the-cm-02-ceiling-microphone/, Feb. 20, 2014, 3 pgs.
Dahl et al., Acoustic Echo Cancelling with Microphone Arrays, Research Report 3/95, Univ. of Karlskrona/Ronneby, Apr. 1995, 64 pgs.
Decawave, Application Note: APR001, UWB Regulations, a Summary of Worldwide Telecommunications Regulations governing the use of Ultra-Wideband radio, Version 1.2, 2015, 63 pp.
Desiraju, et al., "Efficient Multi-Channel Acoustic Echo Cancellation Using Constrained Sparse Filter Updates in the Subband Domain," Acoustic Speech Enhancement Research, Sep. 2014, 4 pp.
Dibiase et al., Robust Localization in Reverberent Rooms, in Brandstein, ed., Microphone Arrays: Techniques and Applications, 2001, Springer-Verlag Berlin Heidelberg, pp. 157-180.
Diethorn, "Audio Signal Processing for Next-Generation Multimedia Communication Systems," Chapter 4, 2004, 9 pp.
Digikey webpage for Converta box (last visited Apr. 22, 2020) <https://www.digikey.com/product-detail/en/bud-industries/CU-452-A/377-1969-ND/439257?utm_adgroup=Boxes&utm_source=google&utm_medium=cpc&utm_campaign=Shopping_Boxes%2C%20Enclosures%2C%20Racks_NEW&utm_term=&utm_content=Boxes&gclid=EAlalQobChMI2JTw-Ynm6AlVgbblCh3F4QKuEAkYCSABEgKybPD_BwE>, 3 pp.

(56) References Cited

OTHER PUBLICATIONS

Digikey webpage for Pomona Box (last visited Apr. 22, 2020) available at <https://www.digikey.com/product-detail/en/pomonaelectronics/3306/501-2054-ND/736489>, 2 pp.
Digital Wireless Conference System, MCW-D 50, Beyerdynamic Inc., 2009, 18 pp.
Do et al., A Real-Time SRP-PHAT Source Location Implementation using Stochastic Region Contraction (SRC) on a Large-Aperture Microphone Array, 2007 IEEE International Conference on Acoustics, Speech and Signal Processing—ICASSP '07, , Apr. 2007, pp. I-121-I-124.
Dominguez, et al., "Towards an Environmental Measurement Cloud: Delivering Pollution Awareness to the Public," International Journal of Distributed Sensor Networks, vol. 10, Issue 3, Mar. 31, 2014, 17 pp.
Dormehl, "HoloLens concept lets you control your smart home via augmented reality," digitaltrends, Jul. 26, 2016, 12 pp.

* cited by examiner

AUDIO BEAMFORMING WITH NULLING CONTROL SYSTEM AND METHODS

CROSS-REFERENCE

This application claims the benefit of U.S. Provisional Patent Application No. 63/266,555, filed on Jan. 7, 2022, which is fully incorporated by reference in its entirety herein.

TECHNICAL FIELD

This application generally relates to audio beamforming. In particular, this application relates to audio beamforming systems and methods that enable more precise control of lobes and nulls of an array microphone, which can result in performance improvements related to acoustic echo cancellation of audio captured by the array microphone.

BACKGROUND

Conferencing environments, such as conference rooms, boardrooms, video conferencing applications, and the like, can involve the use of microphones for capturing sound from various audio sources that are active in such environments. Such audio sources may include humans talking, for example. The captured sound may be disseminated to a local audience in the environment through amplified speakers (for sound reinforcement), and/or to others remote from the environment (such as via a telecast and/or a webcast). The types of microphones and their placement in a particular environment may depend on the locations of the audio sources, physical space requirements, aesthetics, room layout, and/or other considerations. For example, in some environments, the microphones may be placed on a table or lectern near the audio sources. In other environments, the microphones may be mounted overhead to capture the sound from the entire room, for example. Accordingly, microphones are available in a variety of sizes, form factors, mounting options, and wiring options to suit the needs of particular environments.

Array microphones having multiple microphone elements can provide benefits such as steerable coverage or pick up patterns having lobes and/or nulls, which allow the microphones to focus on desired sound sources and reject unwanted sounds such as room noise and other undesired sound sources. The ability to steer audio pick up patterns provides the benefit of being able to be less precise in microphone placement, and in this way, array microphones are more forgiving. Moreover, array microphones provide the ability to pick up multiple audio sources with one array microphone or unit, again due to the ability to steer the pickup patterns.

Beamforming is used to combine signals from the microphone elements of array microphones in order to achieve a certain pickup pattern having one or more lobes and/or nulls. However, even though the lobes of a pickup pattern may be steered to detect sounds from desired sound sources (e.g., a talker in the local environment), the lobes may also detect sounds from undesired sound sources. The detection of sounds from undesired sound sources may be particularly exacerbated when a loudspeaker is in close physical proximity to the microphone elements of an array microphone. For example, the microphone elements may pick up the sound from a remote location (e.g., the far end of a teleconference) that is being played on the loudspeaker. In this situation, the audio transmitted to the remote location may therefore include an undesirable echo, e.g., sound from the local environment as well as sound from the remote location.

Acoustic echo cancellation systems may be able to remove such echo that is picked up by the array microphone before the audio is transmitted to the remote location. However, an acoustic echo cancellation system may work poorly and have suboptimal performance if it needs to constantly readapt and/or is overwhelmed, such as when the sound from a physically proximate loudspeaker is being continually detected by the array microphone. For example, the sound from the loudspeaker (which may include audio from the remote location) may not be completely cancelled by an acoustic echo cancellation system and may be transmitted to the remote location. This may result in overall decreased user satisfaction with the array microphone.

Accordingly, there is an opportunity for audio beamforming systems and methods that enable more precise control of lobes and nulls of an array microphone to optimize the performance of acoustic echo cancellation of audio captured by array microphones.

SUMMARY

The techniques of this disclosure are intended to solve the above-described problems by providing audio beamformer systems and methods that are designed to, among other things: (1) generate a set of beamformer coefficients that result in a beamformed signal associated with one or more lobes steered towards one or more desired sound locations and one or more nulls steered towards one or more undesired sound locations; (2) optimize the beamformer coefficient generation through the use of a process that may involve matrix inversion(s) and/or Lagrange multipliers; and (3) improve and enhance the performance of a downstream acoustic echo cancellation process by more precisely steering nulls to minimize the detection of undesired sound and/or by attenuating specific frequency ranges.

In an embodiment, a method includes receiving a plurality of audio signals from a plurality of microphones; receiving a first steering vector associated with a desired sound location and a second steering vector associated with an undesired sound location; generating a set of beamformer coefficients based on the first steering vector and the second steering vector, where the set of beamformer coefficients is generated to result in a beamformed signal associated with a lobe steered towards the desired sound location and a null steered towards the undesired sound location; and generating a beamformed signal based on the plurality of audio signals and the set of beamformer coefficients, using a frequency domain beamforming technique.

In another embodiment, an audio device includes a plurality of microphones configured to generate a plurality of audio signals, a coefficient generator, and a beamformer in communication with the plurality of microphones and the coefficient generator. The coefficient generator is configured to receive a first steering vector associated with a desired sound location and a second steering vector associated with an undesired sound location, and generate a set of beamformer coefficients based on the first steering vector and the second steering vector, where the set of beamformer coefficients is generated to result in a beamformed signal associated with a lobe steered towards the desired sound location and a null steered towards the undesired sound location. The beamformer is configured to generate a beamformed signal based on the plurality of audio signals and the set of beamformer coefficients, using a frequency domain beamforming technique.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
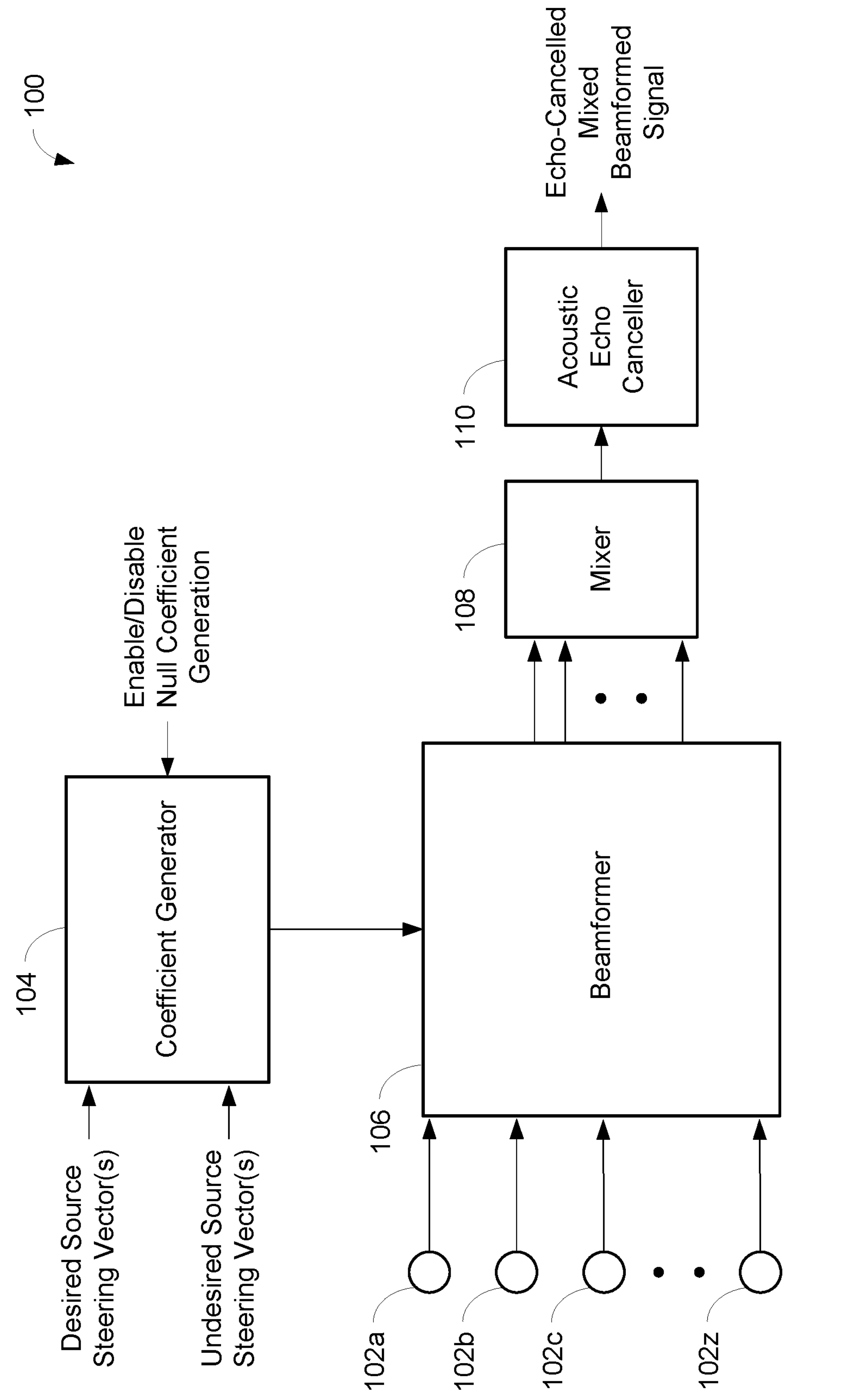
FIG. 1 is a block diagram of an audio beamforming with nulling control system for use with an array microphone, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The audio beamforming systems and methods described herein can enable more precise control of lobes and nulls of an array microphone, which can result in performance improvements related to acoustic echo cancellation (AEC) processing of audio captured by the array microphone. The systems and methods may generate beamformer coefficients that can result in a beamformed signal associated with one or more lobes that are steered towards one or more desired sound locations, and also one or more nulls that are steered towards one or more undesired sound locations. The beamformer coefficients may be generated based on steering vectors associated with the locations of desired sounds (e.g., talkers) and the locations of undesired sounds (e.g., sound from a loudspeaker). In embodiments, a beamformer coefficient generation process may be implemented to optimize the coefficients through the use of a process involving matrix inversion and Lagrange multipliers.

Based on determining optimized beamformer coefficients, audio signals from the elements of the array microphone may be processed using a frequency domain beamforming technique and/or a time domain beamforming technique to generate a beamformed signal. The beamformed signal may include sound detected in the environment that is the result of more precise steering of nulls caused by the optimized beamformer coefficients and the ensuing minimization of the detection of undesired sound in an environment. The performance of a downstream AEC may accordingly be enhanced and improved since the beamformed signal may include less undesired sound, e.g., sound from a remote location that is played on a loudspeaker.

In embodiments, specific frequency ranges may be attenuated by a lobe and/or a null (such as voice rich frequency ranges). Such attenuation may also enhance the performance of a downstream AEC by removing sounds that the AEC no longer has to process. Through the use of the audio beamforming systems and methods described herein, latency and computational resources related to the AEC can be reduced, resulting in improved performance of the AEC. In addition, the occurrence of the undesirable echo of persons at a remote location hearing their own speech and sound can be reduced.

FIG. 1 is a block diagram of an audio beamforming with nulling control system 100 for use with an array microphone. The system 100 may include any suitable number of microphone elements 102*a, b, c,* . . . , z that are included in the array microphone, a coefficient generator 104, a beamformer 106, a mixer 108, and an acoustic echo canceller 110. Various components included in the system 100 may be implemented using software executable by a computing device with a processor and memory, and/or by hardware (e.g., discrete logic circuits, application specific integrated circuits (ASIC), programmable gate arrays (PGA), field programmable gate arrays (FPGA), etc. An exemplary embodiment of a method 200 for beamforming with nulling control, mixing, and echo cancelling of audio signals using the system 100 is described in more detail below with reference to FIG. 2.

The array microphone that includes the microphone elements 102*a, b, c,* . . . , z can detect sounds from audio sources at various frequencies. The array microphone may be utilized in a conference room or boardroom, for example, where the audio sources may be one or more human talkers and/or other desirable sounds. Other sounds may be present in the environment which may be undesirable, such as sounds from loudspeakers (e.g., sound from a remote location of a teleconference), noise from ventilation, other persons, audio/visual equipment, electronic devices, etc. In a typical situation, the audio sources may be seated in chairs at a table, although other configurations and placements of the audio sources are contemplated and possible.

The array microphone may be placed on a table, lectern, desktop, etc. so that the sound from the audio sources can be detected and captured, such as speech spoken by human talkers. The array microphone may be able to form multiple pickup patterns using the system 100 so that the sound from the audio sources is more consistently detected and captured. The microphone elements 102*a, b, c*, . . . , z may be arranged in any suitable layout, including in concentric rings and/or be harmonically nested. The microphone elements 102*a, b, c*, . . . , z may be arranged to be generally symmetric or may be asymmetric, in embodiments. In further embodiments, the microphone elements 102*a, b, c*, . . . , z may be arranged on a substrate, placed in a frame, or individually suspended, for example.

The microphone elements 102*a, b, c*, . . . , z may each be a MEMS (micro-electrical mechanical system) microphone, in some embodiments. In other embodiments, the microphone elements 102*a, b, c*, . . . , z may be electret condenser microphones, dynamic microphones, ribbon microphones, piezoelectric microphones, and/or other types of microphones. In embodiments, the microphone elements 102*a, b, c*, . . . , z may be unidirectional microphones that are primarily sensitive in one direction. In other embodiments, the microphone elements 102*a, b, c*, . . . , z may have other directionalities or polar patterns, such as cardioid, subcardioid, or omnidirectional.

Each of the microphone elements 102*a, b, c*, . . . , z in the array microphone may detect sound and convert the sound to an audio signal. Components in the array microphone, such as analog to digital converters, processors, and/or other components, may process the audio signals and ultimately generate one or more digital audio output signals. In other embodiments, the microphone elements 102*a, b, c*, . . . , z in the array microphone may output analog audio signals so that other components and devices (e.g., processors, mixers, recorders, amplifiers, etc.) external to the array microphone may process the analog audio signals.

In embodiments, an audio device may include the microphone elements 102*a, b, c*, . . . , z of the array microphone and also one or more loudspeakers. The loudspeakers may be utilized, for example, to play sound from a remote location of a teleconference and/or to play other sounds. The microphone elements and the loudspeaker may be located in the same housing, in some embodiments, or may be in separate housings, in other embodiments. The sound from the loudspeakers may be considered an undesired sound, and accordingly, the location of the loudspeaker may be considered an undesired sound location.

The coefficient generator 104 may determine the coefficients for the beamformer 106. The beamformer 106 may utilize the coefficients generated by the coefficient generator 104 to create a beamformed signal associated with one or more lobes steered towards desired sound locations and one or more nulls steered towards undesired sound locations. The coefficient generator 104 may determine the coefficients for the beamformer 106 based on the steering vectors for the locations of desired sound sources and undesired sound sources. In embodiments, desired widths and/or other parameters of lobes and/or nulls may also be utilized by the coefficient generator 104 to determine coefficients for the beamformer 106. The steering vectors for the locations of desired sound sources and undesired sound sources may be determined or configured as a particular three-dimensional coordinate relative to the location of the array microphone, such as in Cartesian coordinates (i.e., x, y, z), or in spherical coordinates (i.e., radial distance r, polar angle θ (theta), azimuthal angle φ (phi)), for example.

The coefficient generator 104 may generate the coefficients for the beamformer 106 such that the lobes associated with the resulting beamformed signal have a positive unity gain and such that the nulls associated with the resulting beamformed signal have an attenuated gain. In embodiments, the gains associated with the lobes may be less than a unity gain. In embodiments, the nulls may have a completely attenuated gain or a less than completely attenuated gain. The attenuated gain associated with the nulls may be less than completely attenuated, for example, in order to assist with maintaining the consistency of the shapes of the lobes of a pickup pattern. For example, a null of a pickup pattern may be configured to not be completely attenuated so that a lobe of the pickup pattern can still have a shape that can adequately detect and capture a desired sound source. This may be beneficial in situations where the steering vectors of a lobe and a null are relatively close together, and where having the null with a completely attenuated gain may negatively impact the pickup of desired sound sources by the lobe.

Figure 3:
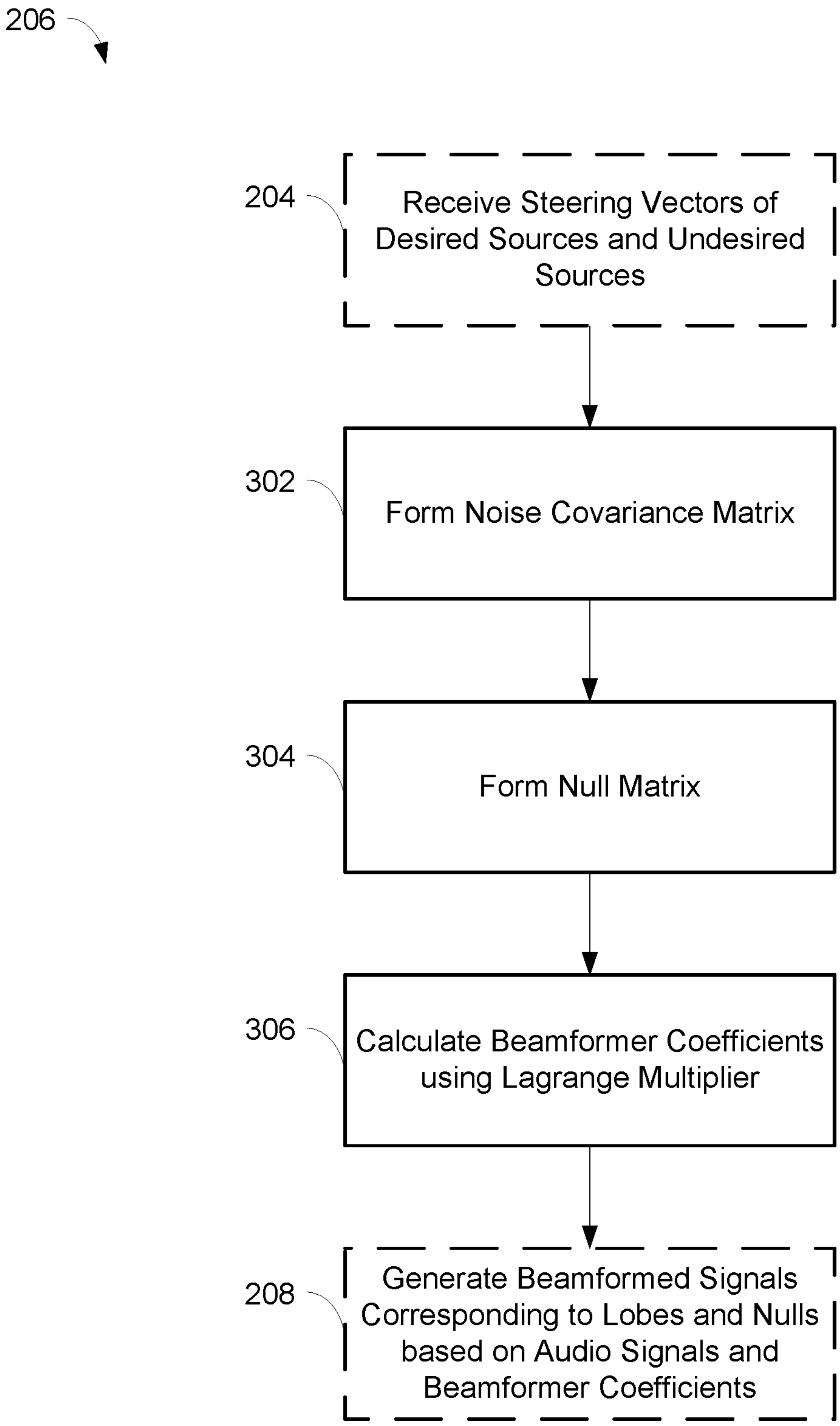
FIG. 3 is a flowchart illustrating operations for the generation of beamformer coefficients, in accordance with some embodiments.

Optimized coefficients for the beamformer 106 may be generated by the coefficient generator 104 using a calculation process involving matrix inversion and/or Lagrange multipliers. Such optimized coefficients may result in lobes and nulls that are more precisely steered towards desired sound sources and undesired sound sources, respectively. The calculation process described herein may also be more efficient and result in quicker generation of the coefficients. An exemplary embodiment of the calculation process is described below with reference to FIG. 3 showing a method 206 for generating coefficients for the beamformer 106 using the coefficient generator 104.

In embodiments, the steering vectors for the locations of desired sound sources and undesired sound sources may be determined by an audio activity localizer or other suitable component that can determine the locations of audio activity in an environment based on the audio signals from the microphone elements 102*a, b, c*, . . . , z. For example, the audio activity localizer my utilize a Steered-Response Power Phase Transform (SRP-PHAT) algorithm, a Generalized Cross Correlation Phase Transform (GCC-PHAT) algorithm, a time of arrival (TOA)-based algorithm, a time difference of arrival (TDOA)-based algorithm, or another suitable sound source localization algorithm. In embodiments, the audio activity localizer may be included in the system 100, may be included in another component, or may be a standalone component.

In other embodiments, the steering vectors for the locations of desired sound sources and undesired sound sources may be determined programmatically or algorithmically using automated decision-making schemes, e.g., automatic focusing, placement, and/or deployment of a beam. Embodiments of such schemes are described in commonly assigned U.S. patent application Ser. Nos. 16/826,115 and 16/887,790, which are hereby incorporated by reference in their entirety herein. In further embodiments, the steering vectors for the locations of desired sound sources and undesired sound sources may be manually configured by a user, e.g., via a user interface on an electronic device in communication with the coefficient generator 104. In still other embodiments, the steering vectors for the locations of desired sound sources and undesired sound sources may be adaptively determined.

In embodiments, the null generation functionality of the coefficient generator 104 may be enabled or disabled, such as by a user. It may be desirable in some scenarios to disable the null generation functionality of the coefficient generator 104 for testing and other purposes, such as if it is desired that all of the audio sources in an environment are to be transmitted to a remote location during a teleconference. When the null generation functionality of the coefficient generator 104 is disabled, the coefficient generator 104 may determine coefficients for the beamformer 106, which the beamformer 106 may utilize to create a beamformed signal associated with one or more lobes steered towards desired sound locations. In this scenario, the coefficient generator 104 may determine coefficients for the beamformer 106 based on the steering vectors for the locations of the desired sound sources.

When the null generation functionality of the coefficient generator 104 is enabled, the coefficient generator 104 may determine the coefficients for the beamformer 106 based on the steering vectors for the locations of the desired sound sources and the steering vectors for the locations of the undesired sound sources. The beamformer 106 may utilize the coefficients to create a beamformed signal associated with one or more lobes steered towards desired sound locations and one or more nulls steered toward undesired sound sources.

Audio signals from the microphone elements 102*a, b, c*, . . . , z may be received at the beamformer 106. The beamformer 106 may generate one or more beamformed signals based on the audio signals from the microphone elements 102*a, b, c*, . . . , z and the coefficients from the coefficient generator 104. The beamformed signals generated by the beamformer 106 may be associated with one or more lobes and/or nulls of a desired pickup pattern. In embodiments, the beamformer 106 may utilize a frequency domain beamforming technique and/or a time domain beamforming technique.

In embodiments, the frequency domain beamforming technique utilized by the beamformer 106 may be a super-directive beamforming technique (such as a minimum variance distortionless response (MVDR) beamforming technique), a delay and sum beamforming technique, and/or another appropriate beamforming technique. In embodiments, the time domain beamforming technique utilized by the beamformer 106 may be a delay and sum beamforming technique, and/or another appropriate beamforming technique. Exemplary embodiments of hybrid audio beamforming systems and methods that may be implemented in the beamformer 106 are described in commonly assigned U.S. Provisional Pat. App. No. 63/142,711 and U.S. patent application Ser. No. 17/586,213, which are hereby incorporated by reference in their entirety herein.

The beamformer 106 may generate the one or more beamformed signals so that the associated null includes attenuation at one or more frequency ranges, such as a frequency range that typically includes human voice or any other frequency range. For example, the frequency range that is attenuated may be between 0 to 2.4 kHz, in some embodiments, or between 0 to 12 kHz in other embodiments. By attenuating certain frequency ranges, the beamformed signals generated by the beamformer 106 may minimize the inclusion of audio that would need to be processed (and possibly cancelled) by the acoustic echo canceller 110.

In embodiments, the frequency ranges that a lobe and/or null is attenuated at may be selected such that an echo return loss enhancement (ERLE) metric of the acoustic echo canceller 110 and/or an echo return loss (ERL) metric is increased. The ERLE metric is a measure of the performance of the acoustic echo canceller 110, and may indicate how much echo has been attenuated from an audio signal. The ERL metric is a ratio of the reference signal (e.g., far end remote signal) and the measured echo in the beamformed signal. In other embodiments, the frequency ranges that a lobe and/or null is attenuated at may be selected based on the ERLE metric of the acoustic echo canceller 110 and/or based on the ERL metric.

The mixer 108 may combine the beamformed signals from the beamformer 106 to generate a mixed beamformed signal. In embodiments, the mixer 108 may gate and/or attenuate a particular beamformed signal to mitigate the contribution of that beamformed signal in the mixed beamformed signal. The mixer 108 may combine the beamformed signals from the beamformer 106 with one or more audio signals from other sources, in some embodiments.

The acoustic echo canceller 110 may receive the mixed beamformed signal from the mixer 108, perform acoustic echo cancellation on the mixed beamformed signal, and generate an echo-cancelled mixed beamformed signal. The echo-cancelled mixed beamformed signal may include mitigation of the sound in a reference audio signal. The reference audio signal may include, for example, the sound received from a remote location and/or locally generated or played sounds that may be picked up by the array microphone and are desired to be removed from the mixed beamformed signal.

The echo-cancelled mixed beamformed signal from the acoustic echo canceller 110 may be transmitted to components or devices (e.g., processors, recorders, amplifiers, etc.) external to the system 100. In embodiments, the echo-cancelled mixed beamformed signal may be transmitted to a remote location (e.g., a far end of a teleconference) and/or played in the local environment for sound reinforcement. In other embodiments, the mixed beamformed signal from the mixer 108 may be transmitted to components or devices external to the system 100 and/or to a remote location, in addition to or in lieu of the echo-cancelled mixed beamformed signal from the acoustic echo canceller 110. In this way, the echo-cancelled mixed beamformed signal may be, for example, transmitted to a remote location without the undesirable echo of persons at the remote location hearing their own speech and sound.

In embodiments, the acoustic echo canceller 110 may process the mixed beamformed signal through a post-mix acoustic echo cancellation algorithm. In such embodiments, the acoustic echo canceller 110 may include a signal selection mechanism that is configured to select at least one of the beamformed signals such that the echo-cancelled mixed beamformed signal is generated based on the mixed beamformed signal, information gathered from the selected beamformed signal, and the reference audio signal. Information gathered from the selected beamformed signal may include, for example, measurements of the background error power and hidden error power of the selected beamformed signal. The signal selection mechanism may include a switch, a mixer that could select a particular beamformed signal (by attenuating some or all of the other beamformed signals), and/or another suitable signal selection mechanism. Exemplary embodiments of post-mix acoustic echo cancellation systems and methods are described in commonly-assigned U.S. Pat. No. 10,367,948 entitled "Post-Mixing Acoustic Echo Cancellation Systems and Methods", which is incorporated by reference in its entirety herein. In some embodiments, the echo-cancelled mixed beamformed signal may be further processed to reduce noise.

Figure 2:
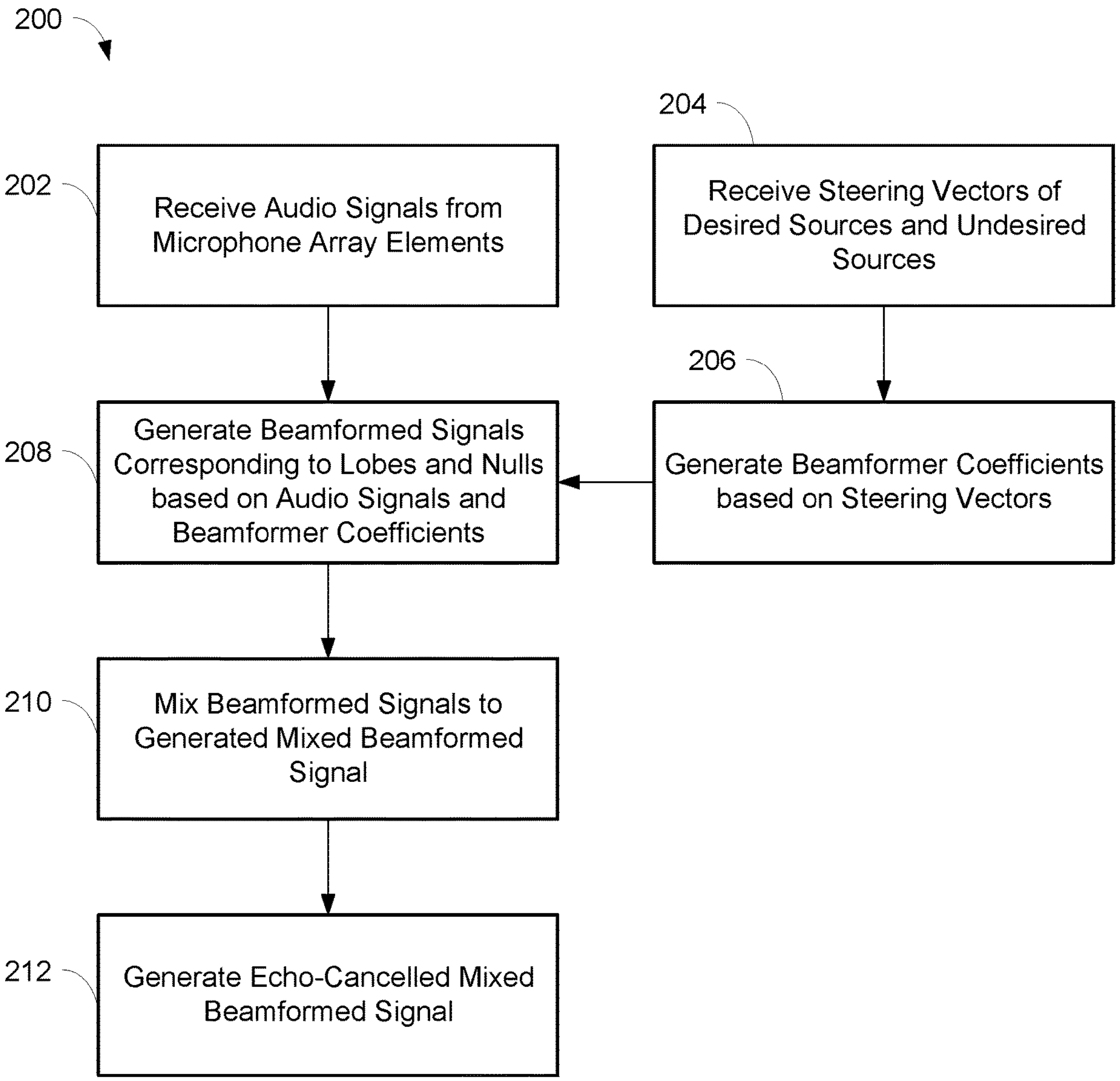
FIG. 2 is a flowchart illustrating operations for the beamforming of audio signals of a plurality of microphones using the audio beamforming with nulling control system of FIG. 1, in accordance with some embodiments.

An embodiment of a method 200 for beamforming with nulling control, mixing, and echo cancelling of audio signals using the system 100 is shown in FIG. 2. The method 200 may be utilized to generate an echo-cancelled mixed beamformed signal using the system 100 shown in FIG. 1, where the echo-cancelled mixed beamformed signal may be associated with lobes that are steered towards desired sound locations and also associated with nulls that are steered towards undesired sound locations. The beamformer coefficients that are generated in the method 200 may be the result of an optimized calculation process involving matrix inversion and Lagrange multipliers. One or more processors and/or other processing components (e.g., analog to digital converters, encryption chips, etc.) within or external to the system 100 may perform any, some, or all of the steps of the method 200. One or more other types of components (e.g., memory, input and/or output devices, transmitters, receivers, buffers, drivers, discrete components, etc.) may also be utilized in conjunction with the processors and/or other processing components to perform any, some, or all of the steps of the method 200.

At step 202, audio signals from the microphone elements 102*a, b, c*, . . . , z may be received at the beamformer 106. Steering vectors associated with the locations of one or more desired sound locations and/or one or more undesired sound locations may be received at step 204 at the coefficient generator 104. At step 206, the coefficient generator 104 may generate beamformer coefficients based on the steering vectors associated with the desired sound locations and the undesired sound locations received at step 204. The beamformer coefficients generated at step 206 may be utilized to generate beamformed signals associated with one or more lobes and/or one or more nulls. The lobes may be steered towards the desired sound locations and the nulls may be steered towards the undesired sound locations. In embodiments, an optimized set of beamformer coefficients may be generated at step 206, as described in more detail below with reference to FIG. 3. Steps 202, 204, and/or 206 may be performed substantially at the same time or may be performed at different times.

At step 208, the beamformer 106 may generate beamformed signals that are associated with one or more lobes and/or nulls of a desired pickup pattern, e.g., lobes steered towards desired sound locations and/or nulls steered towards undesired sound locations. The beamformed signals may be generated at step 208 based on the audio signals received from the microphone elements 102*a, b, c*, . . . , z at step 202 and based on the beamformer coefficients generated at step 206. The beamformer 106 may utilize a frequency domain beamforming technique and/or a time domain beamforming technique at step 208. In embodiments, the lobes associated with the beamformed signal may have a unity gain and the nulls associated with the beamformed signal may have an attenuated gain. In this way, the lobes can be steered to detect the audio of desired sound (e.g., talkers) and the nulls can be steered to ignore the audio of undesired sound (e.g., sound from loudspeakers).

At step 210, the mixer 108 may combine the beamformed signals generated by the beamformer at step 208 to create a mixed beamformed signal. In embodiments, the mixer 108 may generate the mixed beamformed signal at step 210 such that a desired audio mix is created where audio from certain beamformed signals is emphasized while audio from other beamformed signals is deemphasized or suppressed. At step 212, the acoustic echo canceller 110 may perform acoustic echo cancellation on the mixed beamformed signal created at step 210 by the mixer 108 to generate an echo-cancelled mixed beamformed signal.

FIG. 3 shows an embodiment of a method 206 for calculating beamformer coefficients based on steering vectors of desired sound sources and undesired sound sources. The method 206 shown in FIG. 3 may correspond to step 206 of the method 200 shown in FIG. 2. In the method 206 of FIG. 3, the audio signals from the microphone elements 102*a, b, c*, . . . , z may be utilized at step 302 to form a noise covariance matrix. The input audio signals x (n) from the microphone elements 102*a, b, c*, . . . , z may be represented as:

$$x(n) \triangleq x_s(n) + x_\xi(n), \tag{1}$$

where $x_s$ (n) is a column vector of the desired signals and $x_\xi(n)$ is the column vector of the undesired signals (e.g., noise and/or other interference). As seen in equation (1), the input audio signals may be the sum of the desired signals and the undesired signals that are detected in the environment by the array microphone. The output y(n) of the beamformer at a time instant n may be represented as:

$$y(n) \triangleq W^H x(n) = \sum_{m=0}^{M-1} w_m^* x_m(n), \tag{2}$$

where W is a complex vector representing the beamformer coefficients and $(\ )^H$ is a Hermitian transpose. As seen in equation (2), the output y(n) of the beamformer may be based on the beamformer coefficients and the input audio signals.

The noise variance matrix may represent the amount of noise and/or other undesired sounds in an environment. The size of the noise variance matrix may be relatively large, such as based on the number of microphone elements 102*a, b, c*, . . . , z, e.g., M by M, where M is the number of microphone elements 102*a, b, c*, . . . , z. The noise covariance matrix $R_\xi$ may be represented as:

$$R_\xi \triangleq E\left[x_\xi(n) x_\xi(n)^H\right], \tag{3}$$

where $(\ )^H$ represents a Hermitian transpose. As seen in equation (3), the noise covariance matrix may be created based on the undesired signals $x_\xi(n)$.

At step 304, a null matrix may be formed based on the steering vectors of the undesired sound sources received at step 204. The null matrix may represent the locations of the desired sound sources in an environment (e.g., where lobes may be steered towards) and the locations of the undesired sound sources in an environment (e.g., where nulls may be steered towards), and may also include an inversion of the noise covariance matrix formed at step 302. The size of the null matrix may be relatively small, such as based on the number of nulls to be generated. In embodiments, the size of the null matrix may be (1+N) by (1+N), where N is the number of nulls. The null matrix Φ may be represented as:

$$\Phi = \begin{bmatrix} \Phi_{00}\Phi_{01} & \dots & \Phi_{0L} \\ \vdots & \ddots & \vdots \\ \Phi_{L0}\Phi_{L1} & \dots & \Phi_{LL} \end{bmatrix}, \text{ and} \tag{4}$$

$$\Phi_{ij} = v(\theta_i)^H R_\xi^{-1} v(\theta_j),\ i, j = 0, \dots, N,$$

where $v(\theta_i)$ represents the steering vectors for each of the desired sound sources and the undesired sound sources. In particular, steering vector $v(\theta_i)$ may represent delays in the frequency domain which depend on the microphone constellation of the array and the direction of the desired sound sources and/or undesired sound sources. As seen in equation (4), the null matrix Φ may be based on the steering vectors for each of the desired sound sources and the undesired sound sources, and the inverted noise covariance matrix.

At step 306, the beamformer coefficients may be calculated based on the noise covariance matrix formed at step 302, the null matrix formed at step 304, and the steering vectors of desired sound sources and undesired sound sources received at step 204. The beamformer coefficients may be calculated at step 306 using a Lagrange multiplier that includes an inversion of the null matrix. The beamformer coefficients can be solved for by minimizing the variance of noise at the output of the beamformer 106 and minimizing the total power P from the beamformer 106, subject to a unity gain for lobes steered towards desired sound sources and an attenuated gain for the nulls steered towards undesired sound sources.

The minimization of the variance of noise can be represented as:

$$\min_{W} W^H R_\xi W, \text{subject to } W^H v(\theta_s)=1, \text{ and } W^H v(\theta_{n_i})=p_i, \text{ for all } i \text{ in } [1,N] \quad (5),$$

where $p_i$ is an attenuation value for the nulls and N is the number of nulls, and $v(\theta_s)$ and $v(\theta_{n_i})$ represent the steering vectors of desired sound sources and undesired sound sources, respectively. The minimization of the total power from the beamformer P can be represented as:

$$P=W^H R_\xi W+\lambda_s[W^H v(\theta_s)-1]+\Sigma_{i=1}^{N}\lambda_i[W^H v(\theta_{n_i})-p_i] \quad (6),$$

where $\lambda_s$ and $\lambda_i$ are Lagrange multipliers and $p_i$ is the amount of attenuation for the nulls that are being steered towards the undesired sound sources.

Finally, the optimum beamformer coefficients $W_{opt}$ can be calculated as follows:

$$W_{opt} = -R_\xi^{-1}\left[\sum_{i=0}^{N} v(\theta_i)\lambda_i\right], \quad (7)$$

where $v(\theta_i)=v(\theta_s)$ for i=0, and $v(\theta_i)=v(\theta_{n_i})$ for i=1, . . . , N.

As seen in equation (7), the optimum beamformer coefficients may be based on the inverted noise covariance matrix, the steering vectors for each of the desired sound sources and the undesired sound sources, and the Lagrange multipliers.

The beamformer coefficients calculated at step 306 may be utilized by the beamformer 106 at step 208, as described previously. In embodiments, the beamformer coefficients may be calculated at step 306 to take into account the physical configuration of microphone elements 102*a, b, c*, . . . , z of the array microphone. For example, the microphone elements 102*a, b, c*, . . . , z may be arranged in a one-dimensional, two-dimensional, or three-dimensional configuration, and/or may be arranged in any suitable shape. As such, depending on the configuration of the microphone elements 102*a, b, c*, . . . , z, the beamformer coefficients may be calculated at step 306 when there is no conflict between the steering vectors of desired sound sources and undesired sound sources. For example, in a one-dimensional configuration of the microphone elements 102*a, b, c*, . . . , z, the beamformer coefficients may be calculated only if the azimuth for the steering vectors of desired sound sources and undesired sound sources are not the same.

FIGS. 4A-4D show exemplary diagrams depicting various scenarios of an array microphone in an environment and using the system 100 described above to more precisely control lobes and nulls.

Figure 4A:
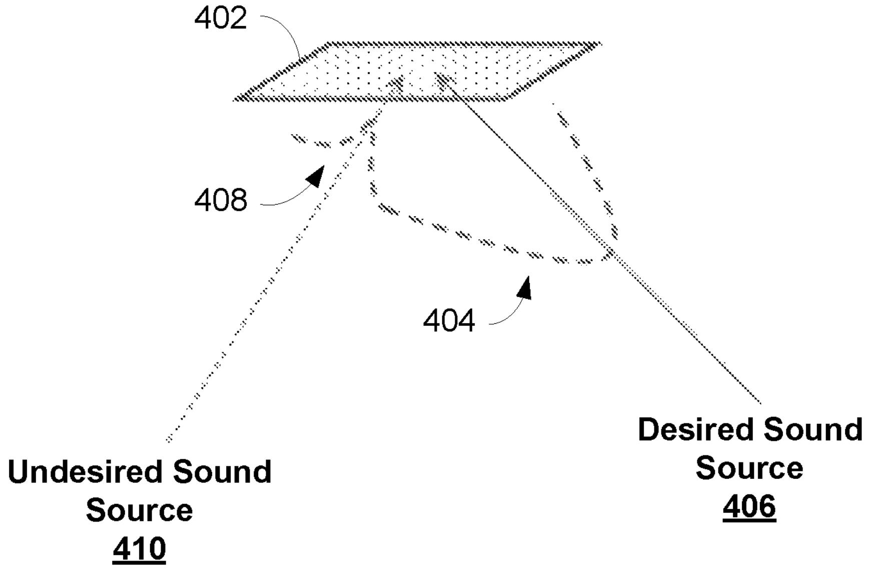
FIGS. 4A-4D are exemplary diagrams depicting a pickup pattern with a single lobe steered towards a desired sound source and a single null steered towards an undesired sound source; a pickup pattern with a single lobe steered towards the desired sound source and multiple nulls steered towards one or more undesired sound sources; and a pickup pattern with multiple lobes steered towards one or more desired sound sources and one or more nulls steered towards one or more undesired sound sources.
Figure 4B:

In the exemplary scenario depicted in FIG. 4A, a pickup pattern of an array microphone 402 may include a single lobe 404 steered towards a desired sound source 406 and a single null 408 steered towards an undesired sound source 410. For example, as depicted in FIG. 4B, there may be a desired source 416 (e.g., a talker) in a location that a single lobe 414 of the array microphone 412 is steered towards to detect sound from, and there may be a loudspeaker 420 in physical proximity to the array microphone 412 that a single null 418 is steered towards to minimize detection of the sound from the loudspeaker 420. In embodiments, the array microphone 412 and the loudspeaker 420 may be in the same housing.

Figure 4C:
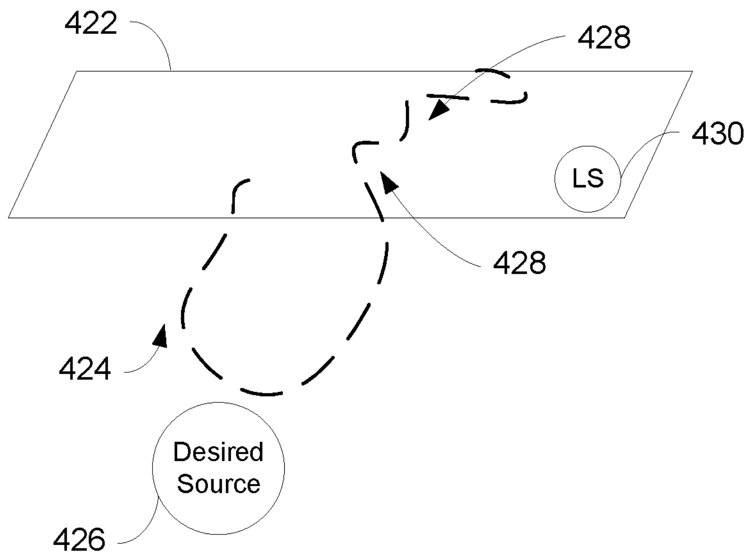

In another exemplary scenario, a pickup pattern of the array microphone may include a single lobe steered towards the desired sound source and multiple nulls steered towards one or more undesired sound sources. For example, as depicted in FIG. 4C, multiple nulls 428 may be steered towards the location of a loudspeaker 430 in order to maximize the attenuation of the sound from the loudspeaker 430, and a single lobe 424 of the array microphone 422 may be steered towards the desired sound source 426. In embodiments, the multiple nulls may be steered to cover an effective area of a relatively large loudspeaker.

Figure 4D:
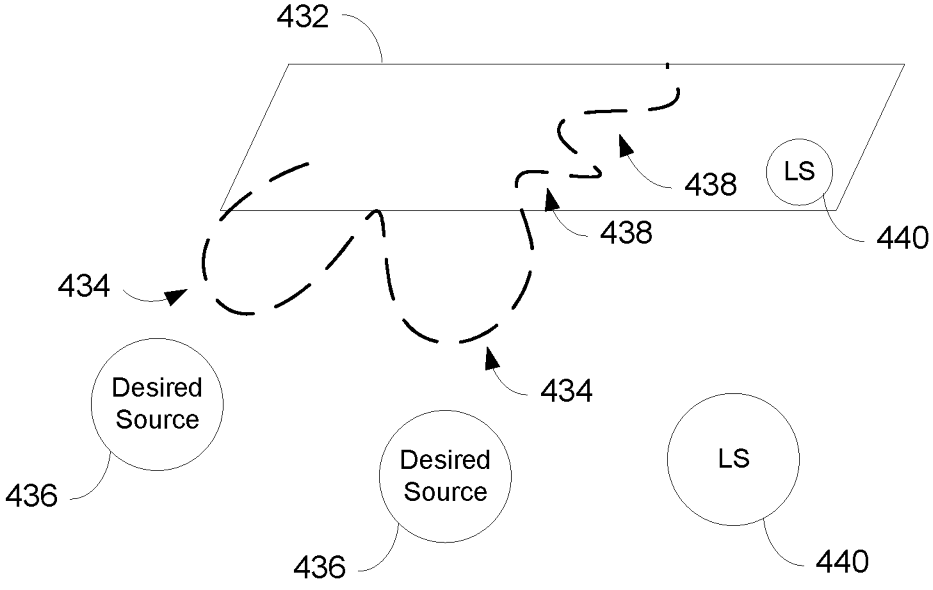

In a further exemplary scenario, a pickup pattern of the array microphone may include multiple lobes steered towards one or more desired sound sources and one or more nulls steered towards one or more undesired sound sources. For example, as depicted in FIG. 4D, multiple lobes 434 of an array microphone 432 may be steered towards several desired sound sources 436 (e.g., active talkers) in an environment, while multiple nulls 438 may be steered towards multiple loudspeakers 440 in the environment.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method, comprising:

receiving a plurality of audio signals from a plurality of microphones;

receiving a first steering vector associated with a desired sound location and a second steering vector associated with an undesired sound location;

generating a set of beamformer coefficients based on the first steering vector and the second steering vector, wherein the set of beamformer coefficients is generated to result in a beamformed signal associated with a lobe steered towards the desired sound location and a null steered towards the undesired sound location; and generating the beamformed signal based on the plurality of audio signals and the set of beamformer coefficients, using a frequency domain beamforming technique.

2. The method of claim 1, wherein the undesired sound location comprises a location of a loudspeaker.

3. The method of claim 1, wherein generating the set of beamformer coefficients comprises generating the set of beamformer coefficients such that the lobe steered towards the desired sound location has a unity gain and the null steered towards the undesired sound location has an attenuated gain.

4. The method of claim 3, wherein the attenuated gain associated with the null is variable relative to a shape of the lobe.

5. The method of claim 1, wherein generating the set of beamformer coefficients comprises generating an optimized set of beamformer coefficients using a Lagrange multiplier.

6. The method of claim 5, wherein generating the optimized set of beamformer coefficients using the Lagrange multiplier comprises:

forming a noise covariance matrix based on undesired sound in the plurality of audio signals;

forming a null matrix based on the noise covariance matrix, the first steering vector associated with the desired sound location, and the second steering vector associated with the undesired sound location; and calculating the optimized set of beamformer coefficients using the Lagrange multiplier and based on the noise covariance matrix, the null matrix, the first steering vector, and the second steering vector.

7. The method of claim 1, further comprising:

mixing the beamformed signal with at least one other beamformed signal to generate a mixed beamformed signal; and performing acoustic echo cancellation on the mixed beamformed signal to generate an echo-cancelled mixed beamformed signal.

8. The method of claim 1, wherein generating the beamformed signal comprises generating the beamformed signal such that the null steered towards the undesired sound location is limited to attenuate a specific frequency range.

9. The method of claim 8, wherein the null steered towards the undesired sound location is limited to attenuate the specific frequency range such that an echo return loss metric of an acoustic echo cancellation process is increased.

10. The method of claim 8, further comprising selecting the specific frequency range based on an echo return loss metric of an acoustic echo cancellation process.

11. The method of claim 1, wherein the set of beamformer coefficients is generated to result in the beamformed signal being further associated with (1) a plurality of lobes each steered towards the desired sound location and comprising the lobe, and (2) a plurality of nulls each steered towards the undesired sound location and comprising the null.

12. The method of claim 1, wherein the set of beamformer coefficients is generated to result in the beamformed signal being further associated with (1) the lobe steered towards the desired sound location, and (2) a plurality of nulls each steered towards a plurality of undesired sound locations and comprising the null.

13. The method of claim 1, wherein the set of beamformer coefficients is generated to result in the beamformed signal being further associated with (1) a plurality of lobes steered towards the desired sound location and comprising the lobe, and (2) the null steered towards the undesired sound location.

14. An audio device, comprising:

a plurality of microphones configured to generate a plurality of audio signals;

a coefficient generator configured to:

receive a first steering vector associated with a desired sound location and a second steering vector associated with an undesired sound location; and generate a set of beamformer coefficients based on the first steering vector and the second steering vector, wherein the set of beamformer coefficients is generated to result in a beamformed signal associated with a lobe steered towards the desired sound location and a null steered towards the undesired sound location; and a beamformer in communication with the plurality of microphones and the coefficient generator, the beamformer configured to generate the beamformed signal based on the plurality of audio signals and the set of beamformer coefficients, using a frequency domain beamforming technique.

15. The audio device of claim 14:

further comprising a loudspeaker; and wherein the undesired sound location comprises a location of the loudspeaker.

16. The audio device of claim 14, wherein the coefficient generator is configured to generate the set of beamformer coefficients by generating an optimized set of beamformer coefficients using a Lagrange multiplier.

17. The audio device of claim 14, further comprising:

a mixer in communication with the beamformer, the mixer configured to mix the beamformed signal with at least one other beamformed signal to generate a mixed beamformed signal; and an acoustic echo canceller in communication with the mixer, the acoustic echo canceller configured to perform acoustic echo cancellation on the mixed beamformed signal to generate an echo-cancelled mixed beamformed signal.

18. The audio device of claim 14, wherein the beamformer is configured to generate the beamformed signal by generating the beamformed signal such that the null steered towards the undesired sound location is limited to attenuate a specific frequency range.

19. The audio device of claim 18, wherein the null steered towards the undesired sound location is limited to attenuate the specific frequency range such that an echo return loss metric of an acoustic echo cancellation process is increased.

20. The audio device of claim 18, wherein the beamformer is further configured to select the specific frequency range based on an echo return loss metric of an acoustic echo cancellation process.

* * * * *